(12) United States Patent
Zhou et al.

(10) Patent No.: US 10,887,939 B2
(45) Date of Patent: Jan. 5, 2021

(54) TRANSMISSION POWER CONTROL FOR BEAM FAILURE RECOVERY REQUESTS

(71) Applicant: Comcast Cable Communications, LLC, Philadelphia, PA (US)

(72) Inventors: Hua Zhou, Herndon, VA (US); Esmael Hejazi Dinan, Herndon, VA (US); Alireza Babaei, Fairfax, VA (US); Hyoungsuk Jeon, Oakton, VA (US); Kyungmin Park, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/101,283

(22) Filed: Aug. 10, 2018

(65) Prior Publication Data
US 2019/0053313 A1 Feb. 14, 2019

Related U.S. Application Data

(60) Provisional application No. 62/543,821, filed on Aug. 10, 2017.

(51) Int. Cl.
| | |
|---|---|
| H04B 7/06 | (2006.01) |
| H04B 17/10 | (2015.01) |
| H04L 5/00 | (2006.01) |
| H04W 52/24 | (2009.01) |
| H04W 74/08 | (2009.01) |

(Continued)

(52) U.S. Cl.
CPC .......... *H04W 76/18* (2018.02); *H04B 7/0695* (2013.01); *H04B 17/103* (2015.01); *H04L 5/0051* (2013.01); *H04W 52/146* (2013.01); *H04W 52/42* (2013.01); *H04W 52/50* (2013.01);
(Continued)

(58) Field of Classification Search
CPC ..... H04B 7/0695; H04B 17/103; H04L 5/005; H04L 5/0051; H04W 52/146; H04W 52/242; H04W 52/42; H04W 52/50; H04W 74/0833; H04W 76/18
See application file for complete search history.

(56) References Cited

U.S. PATENT DOCUMENTS

| | | | |
|---|---|---|---|
| 9,125,218 | B2 | 9/2015 | Chang |
| 9,585,188 | B2 | 2/2017 | Jang et al. |

(Continued)

FOREIGN PATENT DOCUMENTS

| | | |
|---|---|---|
| CN | 108809580 A | 11/2018 |
| EP | 3397015 A1 | 10/2018 |

(Continued)

OTHER PUBLICATIONS

U.S. Appl. No. 16/101,189, Priority of Beam Failure Recovery Request and Uplink Channels, filed Aug. 10, 2018.
(Continued)

*Primary Examiner* — Alpus Hsu
(74) *Attorney, Agent, or Firm* — Banner & Witcoff, Ltd.

(57) ABSTRACT

Systems, apparatuses, and methods are described for wireless communications. A base station may transmit indications of target received powers for a random access procedure and a beam failure recovery procedure. A wireless device may transmit a random access preamble and a beam failure recovery preamble using different transmission powers based on the indications of target received powers.

63 Claims, 29 Drawing Sheets

(51) Int. Cl.
  *H04W 76/18*  (2018.01)
  *H04W 52/50*  (2009.01)
  *H04W 52/14*  (2009.01)
  *H04W 52/42*  (2009.01)

(52) U.S. Cl.
  CPC ........... *H04L 5/005* (2013.01); *H04W 52/242* (2013.01); *H04W 74/0833* (2013.01)

(56) References Cited

U.S. PATENT DOCUMENTS

| | | |
|---|---|---|
| 9,736,795 B2 | 8/2017 | Dinan |
| 9,949,298 B1 | 4/2018 | Akoum et al. |
| 10,278,160 B2 | 4/2019 | Agiwal et al. |
| 10,333,672 B2 | 6/2019 | Nagaraja et al. |
| 10,461,994 B2 | 10/2019 | Liu et al. |
| 10,541,741 B2 | 1/2020 | Islam et al. |
| 10,555,359 B2 | 2/2020 | Xia et al. |
| 2010/0279700 A1 | 11/2010 | Kim et al. |
| 2013/0039345 A1 | 2/2013 | Kim et al. |
| 2013/0188580 A1 | 7/2013 | Dinan |
| 2013/0250828 A1 | 9/2013 | Chou et al. |
| 2015/0189574 A1 | 7/2015 | Ng et al. |
| 2015/0208462 A1 | 7/2015 | Lee et al. |
| 2015/0271796 A1 | 9/2015 | Jang et al. |
| 2015/0365921 A1 | 12/2015 | Wu |
| 2017/0195998 A1 | 7/2017 | Zhang et al. |
| 2017/0207843 A1* | 7/2017 | Jung ................ H04W 74/006 |
| 2017/0332406 A1 | 11/2017 | Islam et al. |
| 2017/0339662 A1 | 11/2017 | Lin et al. |
| 2017/0346545 A1 | 11/2017 | Islam et al. |
| 2017/0373731 A1 | 12/2017 | Guo et al. |
| 2018/0006770 A1* | 1/2018 | Guo ..................... H04L 1/1835 |
| 2018/0034611 A1 | 2/2018 | Nagaraja et al. |
| 2018/0054348 A1 | 2/2018 | Luo et al. |
| 2018/0054382 A1 | 2/2018 | Luo et al. |
| 2018/0054783 A1 | 2/2018 | Luo et al. |
| 2018/0054811 A1 | 2/2018 | Luo et al. |
| 2018/0054812 A1 | 2/2018 | Luo et al. |
| 2018/0054832 A1 | 2/2018 | Luo et al. |
| 2018/0083753 A1 | 3/2018 | Nagaraja et al. |
| 2018/0098334 A1 | 4/2018 | Tie et al. |
| 2018/0110066 A1 | 4/2018 | Luo et al. |
| 2018/0115940 A1 | 4/2018 | Abedini et al. |
| 2018/0115990 A1 | 4/2018 | Abedini et al. |
| 2018/0124687 A1 | 5/2018 | Park et al. |
| 2018/0132266 A1 | 5/2018 | Chen et al. |
| 2018/0138962 A1* | 5/2018 | Islam ................ H04L 5/0048 |
| 2018/0176958 A1 | 6/2018 | Islam et al. |
| 2018/0191422 A1 | 7/2018 | Xia et al. |
| 2018/0219604 A1* | 8/2018 | Lu ..................... H04B 7/0695 |
| 2018/0220448 A1 | 8/2018 | Akkarakaran et al. |
| 2018/0227899 A1 | 8/2018 | Yu et al. |
| 2018/0234960 A1 | 8/2018 | Nagaraja et al. |
| 2018/0241452 A1 | 8/2018 | Akkarakaran et al. |
| 2018/0249453 A1 | 8/2018 | Nagaraja et al. |
| 2018/0270689 A1 | 9/2018 | Akkarakaran et al. |
| 2018/0270698 A1 | 9/2018 | Babaei et al. |
| 2018/0270699 A1 | 9/2018 | Babaei et al. |
| 2018/0270700 A1 | 9/2018 | Babaei et al. |
| 2018/0278310 A1 | 9/2018 | Lee et al. |
| 2018/0279150 A1 | 9/2018 | He et al. |
| 2018/0279193 A1* | 9/2018 | Park ..................... H04W 36/08 |
| 2018/0279229 A1 | 9/2018 | Dinan et al. |
| 2018/0288756 A1 | 10/2018 | Xia et al. |
| 2018/0302889 A1 | 10/2018 | Guo et al. |
| 2018/0310321 A1 | 10/2018 | Basu Mallick et al. |
| 2018/0317123 A1 | 11/2018 | Chen et al. |
| 2018/0323856 A1 | 11/2018 | Xiong et al. |
| 2018/0324723 A1 | 11/2018 | Akkarakaran et al. |
| 2018/0324867 A1 | 11/2018 | Basu Mallick et al. |
| 2018/0343653 A1 | 11/2018 | Guo |
| 2018/0351611 A1 | 12/2018 | Nagaraja et al. |
| 2018/0359790 A1 | 12/2018 | Ingale et al. |
| 2018/0367374 A1* | 12/2018 | Liu ..................... H04W 76/18 |
| 2018/0368126 A1* | 12/2018 | Islam .................... H04W 16/28 |
| 2018/0368142 A1 | 12/2018 | Liou |
| 2018/0375560 A1 | 12/2018 | Wei |
| 2019/0028174 A1* | 1/2019 | Chakraborty ......... H04W 76/18 |
| 2019/0037423 A1* | 1/2019 | Yu ......................... H04W 24/04 |
| 2019/0037498 A1 | 1/2019 | Tseng et al. |
| 2019/0044792 A1 | 2/2019 | Kwon et al. |
| 2019/0052339 A1* | 2/2019 | Zhou ................... H04L 27/2692 |
| 2019/0053294 A1 | 2/2019 | Kia et al. |
| 2019/0059129 A1 | 2/2019 | Luo et al. |
| 2019/0074882 A1 | 3/2019 | Zhou et al. |
| 2019/0075600 A1 | 3/2019 | Kwon et al. |
| 2019/0090143 A1 | 3/2019 | Luo et al. |
| 2019/0104549 A1 | 4/2019 | Deng et al. |
| 2019/0141555 A1 | 5/2019 | Tooher et al. |
| 2019/0159234 A1 | 5/2019 | Yi et al. |
| 2019/0173740 A1 | 6/2019 | Zhang et al. |
| 2019/0268893 A1 | 8/2019 | Tsai et al. |
| 2020/0059285 A1 | 2/2020 | Zhang et al. |
| 2020/0059898 A1 | 2/2020 | Osawa et al. |
| 2020/0068416 A1 | 2/2020 | Kang et al. |
| 2020/0092785 A1 | 3/2020 | Yang |
| 2020/0120714 A1 | 4/2020 | Wang et al. |
| 2020/0178338 A1 | 6/2020 | Ahn et al. |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |

(56) References Cited

FOREIGN PATENT DOCUMENTS

| WO | 2018230862 A1 | 12/2018 |
|---|---|---|
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

U.S. Appl. No. 16/101,239, Resource Configuration of Beam Failure Recovery Request Transmission, filed Aug. 10, 2018.
U.S. Appl. No. 16/101,307, Beam Failure Recovery Request Transmission, filed Aug. 10, 2018.
U.S. Appl. No. 16/125,434, Unified Downlink Control Information for Beam Management, filed Sep. 7, 2018.
U.S. Appl. No. 16/146,913, Beam Management with DRX Configuration, filed Sep. 28, 2018.
U.S. Appl. No. 16/193,971, Beam Paging Assistance, filed Nov. 16, 2018.
U.S. Appl. No. 16/243,714, Beam Selection in Beam Failure Recovery Request Retransmission, filed Jan. 9, 2019.
U.S. Appl. No. 16/271,435, Beam Failure Recovery in Carrier Aggregation, filed Feb. 8, 2019.
U.S. Appl. No. 16/277,400, Beam Failure Report, filed Feb. 15, 2019.
U.S. Appl. No. 16/354,752, Downlink Partial Beam Failure Recovery, filed Mar. 15, 2019.
U.S. Appl. No. 16/370,476, Configuration for Beam Failure Recovery, filed Mar. 29, 2019.
U.S. Appl. No. 16/372,858, Beam Failure Recovery, filed Apr. 2, 2019.
U.S. Appl. No. 16/409,103, Prioritization in Beam Failure Recovery Procedures, filed May 10, 2019.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR Ah#2, Qingdao, China, Jun. 27-30, 2017, Source: CATT, Title: RACH power contol and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38321 V15.0.0 (Dec. 2017); Technical Specification; 3rd Generation Partnership Project; Technical Specification Group Radio Access Network; NR; Medium Access Control (MAC) protocol specification (Release 15).
3GPP Ts 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101bis, Sanya, China, Apr. 16-20, 2018, Source: Spreadtrum Communications, Title: Beam Failure recovery on SCell.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).
3GPP TR 38.912 V14.0.0 (Mar. 2017); Technical Report; 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.

(56) References Cited

OTHER PUBLICATIONS

R1-1710400 3GPP TSG RAN WG1 NR Ad-Hoc#2, Qingdao, China, Jun. 27-30, 2017, Source: Vivo, Title: Beam failure recovery procedure.

R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.

R1-1710810 3GPP TSG RAN WG1 AH_NR Meeting, Qingdao, China, Jun. 27-30, 2017, Source: MediaTek Inc., Title: Mechanism for flexible beam failure recovery.

R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.

R1-1711017 3GPP TSG RAN WG1 #89ah-NR, Qingdao, China, Jun. 27-30, 2017, Source: Ericsson, Title: Mechanism to recover from beam failure.

R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.

R2-1706680 3GPP TSG-RAN WG2 NR-Adhoc, Qingdao, China, Jun. 27-29, 2017, Source: AT&T, Title: Beam Failure Recovery Mechanism and RLF.

3GPP TSG-RAN WG2 NR Ad Hoc, Qingdao, China, Jun. 27-29, 2017, Source: RAN2 Chairman (Intel), Object: Chairman Notes.

PRACH—Preamble Detection and Timing Advance Estimation for multi-UE in 3GPP LTE, 3GPP LTE Solutions, from www.mymowireless.com.

Jul. 16, 2019—European Extended Search Report—EP 19166184.2.

R1-1702078 3GPP TSG RAN WG1 Meeting #88, Athens, Greece, Feb. 13-17, 2017, Source: CATT, Title: Considerations on beam recovery mechanism.

R1-1707121 3GPP TSG RAN WG1 Meeting #89, Hangzhou, China, May 15-19, 2017, Source: ZTE, Title: Discussion on beam recovery mechanism.

3GPP TS 38.213 V15.0.0 (Dec. 2017); Technical Specification; 3rd Generation Partnership Project; Technical Specification Group Radio Access Network; NR; Physical layer procedures for control (Release 15).

3GPP TS 38.213 V15.1.0 (Mar. 2018); Technical Specification; 3rd Generation Partnership Project; Technical Specification Group Radio Access Network; NR; Physical layer procedures for control (Release 15).

3GPP TS 38321 V15.1.0 (Mar. 2018); Technical Specification; 3rd Generation Partnership Project; Technical Specification Group Radio Access Network; NR; Medium Access Control (MAC) protocol specification (Release 15).

3GPP TS 38331 V15.1.0 (Mar. 2018); Technical Specification; 3rd Generation Partnership Project; Technical Specification Group Radio Access Network; NR; Radio Resource Control (RRC) protocol specification (Release 15).

R1-180xxxx 3GPP TSG RAN WG1 Meeting #93 Busan, South Korea, May 21-25, 2018, Source: Ericsson, Title: Feature lead summary for beam measurement and reporting.

R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.

R1-1803362 3GPP TSG RAN WG1 Meeting #92, Athens, Greece, Feb. 26-Mar. 2, 2018, Source:MediaTek, Inc. Title: Summary on remaining issues on Beam Failure Recovery.

R1-180xxxx 3GPP TSG RAN WG1 Meeting #93 Busan, South Korea, May 21-25, 2018, Source: MediaTek Inc., Title: Summary on Remaining issues on Beam Failure Recovery.

R1-1704400 3GPP TSG RAN WG1 Meeting #88bis, Spokane, USA, Apr. 3-7, 2017, Source: ZTE, ZTE Microelectronics, Title: Discussion on beam recovery mechanism.

R1-1704465 3GPP TSG RAN WG1 Meeting #88bis, Spokane, USA, Apr. 3-7, 2017, Source: MediaTek, Inc., Title: Discussion on beam recovery mechanism.

R1-1801454 3GPP TSG RAN WG1 Meeting #92, Athens, Greece, Feb. 26-Mar. 2, 2018, Source: Huawei, HiSilicon, Title: Remaining issues on beam failure recovery.

R1-1801722 3GPP TSG RAN WG1 Meeting #92, Athens, Greece, Feb. 26-Mar. 2, 2018, Source: CATT, Title: Remaining issues on DL beam failure recovery.

R1-1802393 3GPP TSG RAN WG1 Meeting #92, Athens, Greece, Feb. 26-Mar. 2, 2018, Source: Intel Corporation, Title: On beam management issues for mutli-CC operation.

R1-1802397 3GPP TSG RAN WG1 Meeting #92, Athens, Greece, Feb. 26-Mar. 2, 2018, Source: Intel Corporation, Title: Remaining Issues on Beam Failure Recovery Intel.

R1-1802472 3GPP TSG RAN WG1 Meeting #92, Athens, Greece, Feb. 26-Mar. 2, 2018, Source: NTT DOCOMO, Title: Remaining issues on beam recovery.

R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.

R1-1802593 3GPP TSG RAN WG1 Meeting #92, Athens, Greece, Feb. 26-Mar. 2, 2018, Source AT&T, Title: In support of partial beam failure.

R1-1802744 3GPP TSG RAN WG1 Meeting #92, Athens, Greece, Feb. 26-Mar. 2, 2018, Source: Ericsson, Title: Remaining details on beam recovery.

R1-1802824 3GPP TSG RAN WG1 Meeting #92, Athens, Greece, Feb. 26-Mar. 2, 2018, Source: Qualcomm Incorporated, Title: Beam recovery procedures.

R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.

R1-1803745 3GPP TSG-RAN WG1 Meeting #92bis, Sanya, China, Apr. 16-20, 2018, Source: CATT, Title: Remaining Details on Beam Failure Recovery.

R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.

R1-1804363 3GPP TSG-RAN WG1 Meeting #92bis, Sanya, China, Apr. 16-20, 2018, Source: Samsung, Title: Simultaneous Reception of Physical Channels and Reference Signals.

R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.

R1-1804975 3GPP TSG-RAN WG1 Meeting #92bis, Sanya, China, Apr. 16-20, 2018, Source: Ericsson, Title: Remaining Issues on Beam Recovery.

R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.

R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.

R1-1806616 3GPP TSG-RAN WG1 #93, Busan, Korea, May 21-25, 2018, Source: LG Electronics, Title: Remaining Issues on Search Space.

R1-1806729 3GPP TSG-RAN WG1 #93, Busan, Korea, May 21-25, 2018, Source: Samsung, Title: Corrections on Search Space Design.

R2-1707999 3GPP TSG-RAN WG2 #99, Berlin, Germany, Aug. 21-25, 2017, Source: MediaTek Inc., Title: Beam Management and Beam Recovery in MAC.

R2-1708677 3GPP TSG RAN WG2 #99, Berlin, Germany, Aug. 21-25, 2017, Source: Nokia, Nokia Shanghai Bell, Title: Beam Recovery in NR.

R2-1708697 3GPP TSG RAN WG2 #99, Berlin, Germany, Aug. 21-25, 2017, Source: Huawei, HiSilicon, Title: Handling of Resources for Beam Failure Recovery.

R2-1709085 3GPP TSG-RAN WG2 #99, Berlin, Germany, Aug. 21-25, 2017, Source: Qualcomm Incorporated, Title: Beam Recovery Request.

R2-1709320 3GPP TSG-RAN WG2 #99, Berlin, Germany, Aug. 21-25, 2017, Source: ASUSTeK, Title: Discussion on Beam Recover Request in NR.

(56) References Cited

OTHER PUBLICATIONS

R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CE.

R1-1704478 3GPP TSG RAN WG1 Meeting #88bis, Spokane, USA, Apr. 3-7, 2017, Source: Fujitsu, Title: Discussion on beam failure recovery procedure.
R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.

(56) References Cited

OTHER PUBLICATIONS

R1-1800363 3GPP TSG RAN WG1 Meeting AH 1801, Vacnouver, Canada, Jan. 22-26, 2018, Source: LG Electronics, Title: Text proposals on UL beam management.

R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.

R1-1800401 3GPP TSG RAN WG1 Meeting AH 1801, Vancouver, Canada, Jan. 22-26, 2018, Source: Lenovo, Motorola Mobility, Title: Corrections Meeting on beam management.

R1-1800402 3GPP TSG RAN WG1 Meeting AH 1801, Vancouver, Canada, Jan. 22-26, 2018, Source: Lenovo Motorola Mobility, Title: Corrections Meeting on beam failure recovery.

R1-1800432 3GPP TSG RAN WG1 Meeting AH 1801, Vancouver, Canada, Jan. 22-26, 2018, Source: Samsung Title: Issues on beam management.

R1-1800433 3GPP TSG RAN WG1 Meeting AH 1801, Vancouver, Canada, Jan. 22-26, 2018, Source: Samsung, Title: Aperiodic beam reporting.

R1-1800434 3GPP TSG RAN WG1 Meeting AH 1801, Vancouver, Canada, Jan. 22-26, 2018, Source: Samsung Title: Issues on beam failure recovery.

R1-1800472 3GPP TSG RAN WG1 Meeting AH 1801, Vancouver, Canada, Jan. 22-26, 2018, Source: Samsung Title: PHR for CA.

R1-1800498 3GPP TSG RAN WG1 Meeting AH 1801, Vancouver, Canada, Jan. 22-26, 2018, Source: OOPO, Title: Text Proposal for Beam Management.

R1-1800499 3GPP TSG RAN WG1 Meeting AH 1801, Vancouver, Canada, Jan. 22-26, 2018, Source: OPPO, Title: Text Proposal for Beam Failure Recovery.

R1-1715941 3GPP TSG RAN WG1 Meeting NR#3, Nagoya Japan, Sep. 18-21, 2017, Source: Samsung, Title: Beam Failure recovery.

R1-1716295 3GPP TSG RAN WG1 Meeting NR#3, Nagoya, Japan, Sep. 18-21, 2017, Source: Intel Corporation, Title: Remaining Issues on Beam Failure Recovery.

R1-1716397 3GPP TSG RAN WG1 Meeting NR#3, Nagoya, Japan, Sep. 18-21, 2017, Source: Qualcomm Incorporated, Title: Beam recovery procedure.

R1-1716500 3GPP TSG RAN WG1 Meeting NR#3, Nagoya, Japan, Sep. 18-21, 2017, Source: Nokia, Nokia Shanghai Bell, Title Beam Recovery in NR.

R1-1716469 3GPP TSG RAN WG1 Meeting NR#3, Nagoya, Japan, Sep. 18-21, 2017: Source: InterDigital, Inc., Title: Remaining issues on beam recovery.

R1-1717302 3GPP TSG RAN WG1 Meeting #90bis, Prague, Czech Republic, Sep. 9-13, 2017, Source: Huawei, HiSilicon Title: Beam failure recovery design details.

R1-1717369 3GPP TSG RAN WG1 Meeting #90bis, Prague, Czech Republic, Oct. 9-13, 2017, Source: Intel Corporation, Title: Remaining Issues on Beam Failure Recovery.

R1-1717473 3GPP TSG RAN WG1 Meeting #90bis, Prague, Czech Republic, Oct. 9-13, 2017, Source: vivo, Title: Discussion on beam failure recovery.

R1-1717606 3GPP TSG RAN WG1 Meeting #90bis, Prague, Czech Republic, Oct. 9-13, 2017, Source: Samsung, Title: Beam failure recovery.

R1-1717942 3GPP TSG RAN WG1 Meeting #90bis, Prague, Czech Republic, Oct. 9-13, 2017, Source: LG Electronics, Title: Discussion on beam failure recovery.

R1-1718010 3GPP TSG RAN WG1 Meeting #90bis, Prague, Czech Republic, Oct. 9-13, 2017, Source: NEC, Title: Discussion on Beam Failure Recovery.

R1-1718055 3GPP TSG RAN WG1 Meeting #90bis, Prague, Czech Republic, Oct. 9-13, 2017, Source: OPPO, Title: Discussion on Beam Recovery Mechanism.

R1-1718193 3GPP TSG RAN WG1 Meeting #90bis, Prague, Czech Republic, Oct. 9-13, 2017, Source: NTT DOCOMO, Title: Views on beam recovery.

R1-1718389 3GPP TSG RAN WG1 Meeting #90bis, Prague, Czech Republic, Oct. 9-13, 2017, Source: AT&T, Title: Beam Recovery for Full and Partial Control Channel Failure.

R1-1718512 3GPP TSG RAN WG1 Meeting #90bis, Prague, Czech Republic, Oct. 9-13, 2017, Source: Nokia, Nokia Shanghai Bell, Title: Beam Recovery in NR.

R1-1718542 3GPP TSG RAN WG1 Meeting #90bis, Prague Czech Republic, Oct. 9-13, 2017, Source: Qualcomm Incorpated, Title: Beam recovery procedure.

R2-1802554 3GPP TSG-RAN WG2 #101, Athens, Greece, Feb. 26-Mar. 2, 2018, Source: ASUSTeK, Title: Discussion on Beam Failure Recovery Request in NR.

R2-1803195 3GPP TSG-RAN WG2 #101, Athens, Greece, Feb. 26-Mar. 2, 2018, Source: Ericsson, Title: Beam Failure Recovery in Scell.

R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.

R2-18006164 3GPP TSG-RAN WG2 Meeting #101bis, Sanya, China, Apr. 16-20, 2018, Source: Media Tek Inc., Title: On Parallel SR and RACH Procedure in NR.

R1-170xxxx 3GPP TSG RAN WG1 Meeting #88b, Spokane, USA, Apr. 3-7, 2017, Source: Huawei, HiSilicon, Title: WF on Beam Failure Recovery.

R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.

R1-1704230 3GPP TSG RAN WG1 Meeting #88b, Spokane, USA, Apr. 3-7, 2017, Source: Huawei, HiSilicon, Title: Link recovery procedure for beam failure.

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).

3GPP TSG RAN WG1 Meeting #90, Prague, Czech Republic, Aug. 21-25, 2017, Title: RAN1 Chairman's Notes.

R1-1705719 3GPP TSG RAN WG1 Meeting #88bis, Spokane, USA, Apr. 3-7, 2017, Source: NTT DOCOMO, Inc., Title: Further views on mechanism to recover from beam failure.

R1-1711016 3GPP TSG RAN WG1 #89AH-NR, Qingdao, China, Jun. 27-30, 2017, Source: Ericsson, Title: UL beam management details.

R1-1712223 3GPP TSG RAN WG1 Meeting #90, Prague, Czech Republic, Aug. 21-25, 2017, Source: Huawei, HiSilicon, Title: UL beam management.

R1-1712224 3GPP TSG RAN WG1 Meeting #90, Prague, Czech Republic, Aug. 21-25, 2017, Source: Huawei HiSilicon, Title: Procedure details for beam failure recovery.

R1-1712268 3GPP TSG RAN WG1 Meeting #90, Prauge, Czech Republic, Aug. 21-25, 2017, Source: Xinwei, Title: Discussion on beam failure recovery.

R1-1712299 3GPP TSG RAN WG1 Meeting #90, Prague, Czech Republic, Aug. 21-25, 2017, Source: ZTE, Title: UL beam management for NR MIMO.

R1-1712378 3GPP TSG RAN WG1 Meeting #90, Prauge, Czech Republic, Aug. 21-25, 2017, Source: CATT, Title: Considerations on UL beam management.

R1-1712379 3GPP TSG RAN WG1 Meeting #90, Prague, Czech Republic, Aug. 21-25, 2017, Source: CATT, Title: Beam failure detection and recovery.

R1-1712551 3GPP TSG RAN WG1 Meeting #90, Prague, Czech Republic, Aug. 21-25, 2017, Source: Intel Corporation, Title: Details for UL beam management.

R1-1712552 3GPP TSG RAN WG1 Meeting #90, Prague, Czech Republic, Aug. 21-25, 2017, Source: Intel Corporation, Title: Discussion for mechanism to recover from beam failure.

R1-1721672 3GPP TSG RAN WG1 Meeting #90, Prague, Czech Republic, Aug. 21-25, 2017, Source: Lenovo, Motorola Mobility, Title: Discussion of beam failure recovery.

R1-1712713 3GPP TSG RAN WG1 Meeting #90, Prague, Czech republic, Aug. 21-25, 2017, Source: AT&T, Title: Mechanisms to recover from beam failure.

(56) References Cited

OTHER PUBLICATIONS

R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Speadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov.-Dec. 1, 2017, Source: LG Electronics, Title: Discussion on beam failure recovery.
R1-1719988 3GPP TSG RAN WG1 Meeting #91, Reno, USA, Nov.-Dec. 1, 2017, Source: Dicussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #9, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling patial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.

(56) References Cited

OTHER PUBLICATIONS

R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Inc., Vancouver, Canada, Jan. 22-26, 2018, Source: InterDigital, Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP R2 WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG-RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG RAN WG2 Meeting #102, Busan, Korea, May 21-25, 2018, Source: Huawei, HiSilicon, Title: Discussion on BFR-contig for SCell BFR.
R2-1807975 3GPP TSG RAN WG2 Meeting #102, Busan, Korea, May 21-25, 2018, Source: Huawei, HiSilicon, Title: Discussion on beam failure recovery for SCell.
R2-1808024 3GPP TSG RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG RAN WG2 Meeting #102, Busan, Korea, May 21-25, 2018, Source: ITL, Title: Beam failure recovery on SCell.
R2-1808809 3GPP TSG RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.

(56) References Cited

OTHER PUBLICATIONS

R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.

(56) References Cited

OTHER PUBLICATIONS

R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH contiguration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.

* cited by examiner

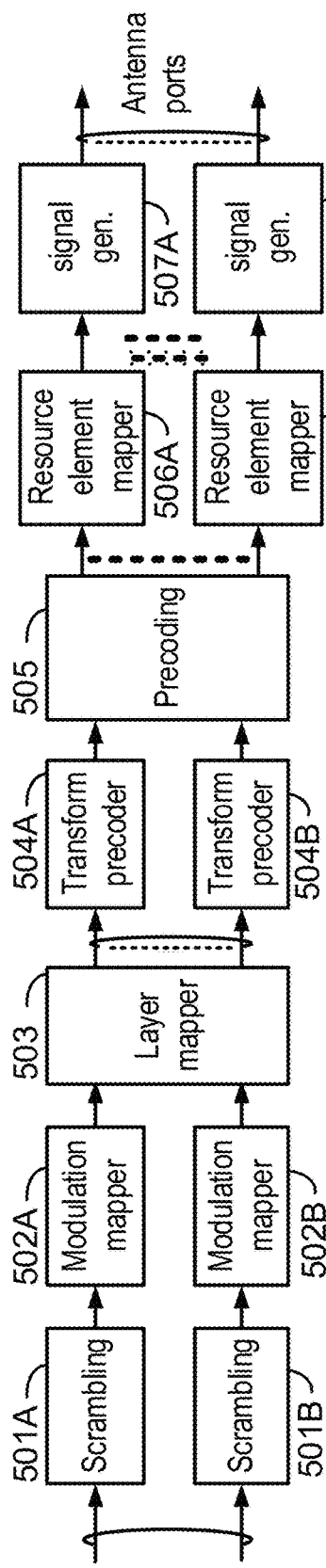
FIG. 5A Example uplink physical channel
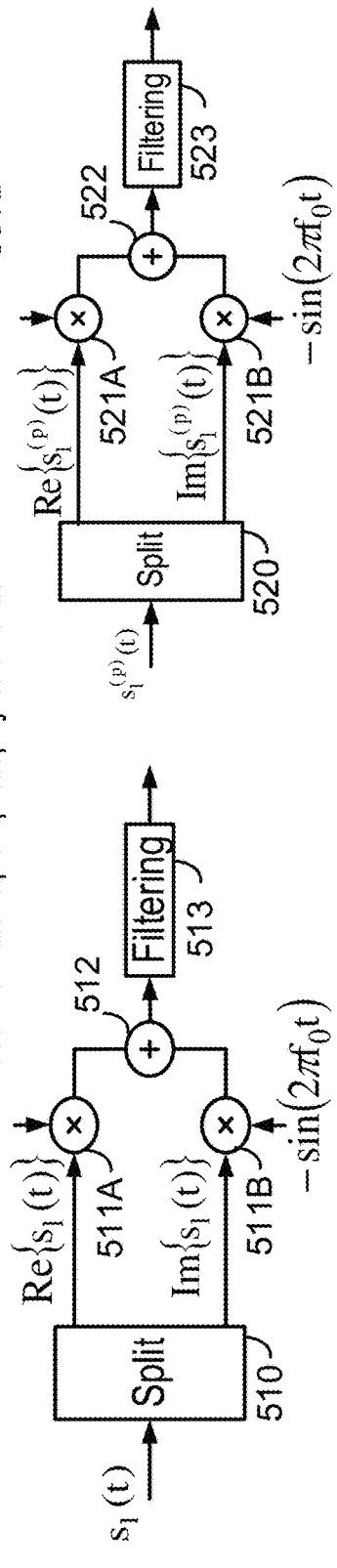
FIG. 5B Example uplink modulation
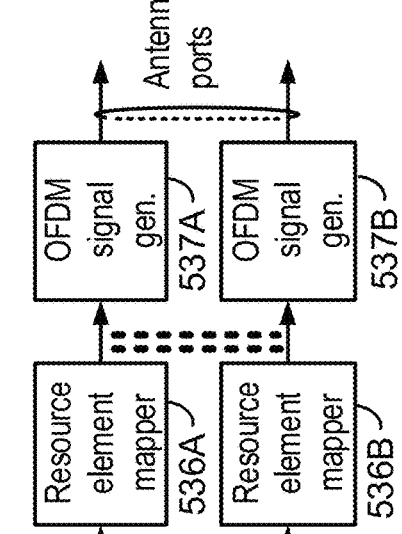
FIG. 5D Example downlink modulation
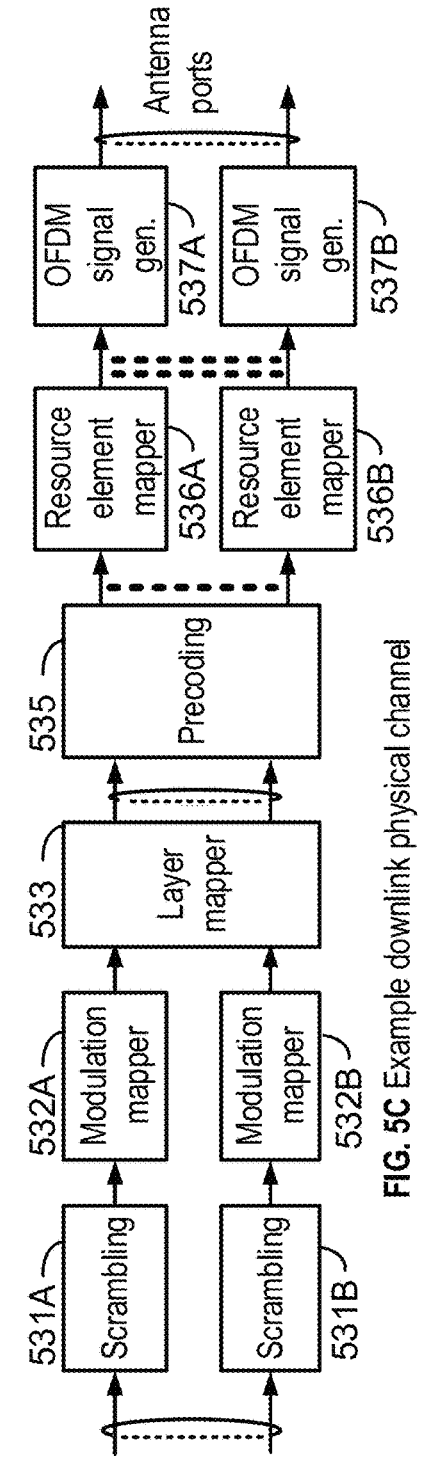
FIG. 5C Example downlink physical channel

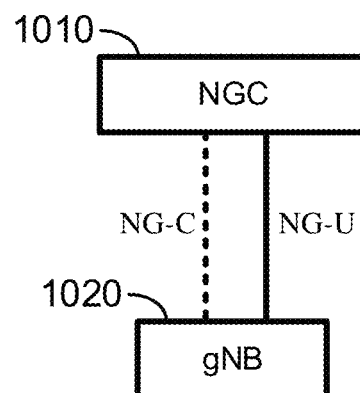
FIG. 10A gNB connected to NGC
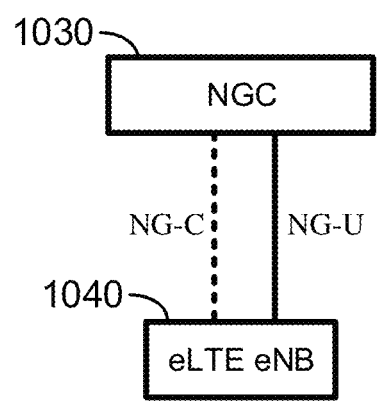
FIG. 10B eLTE eNB connected to NGC

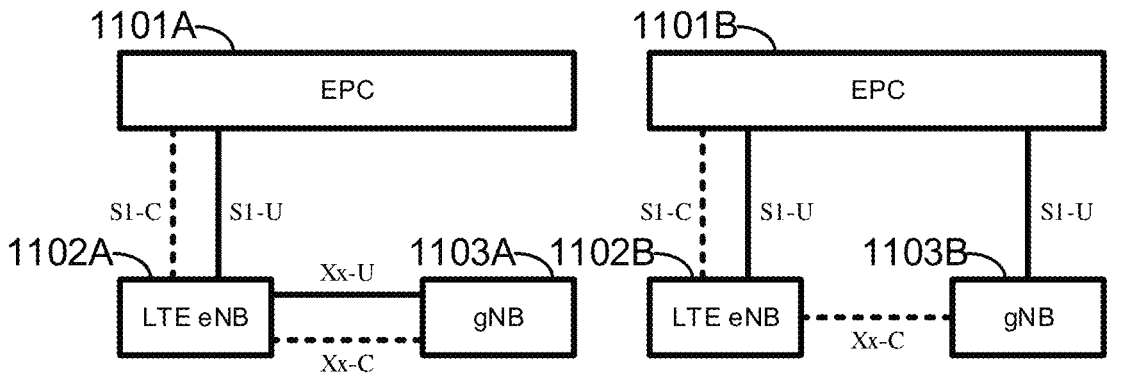

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

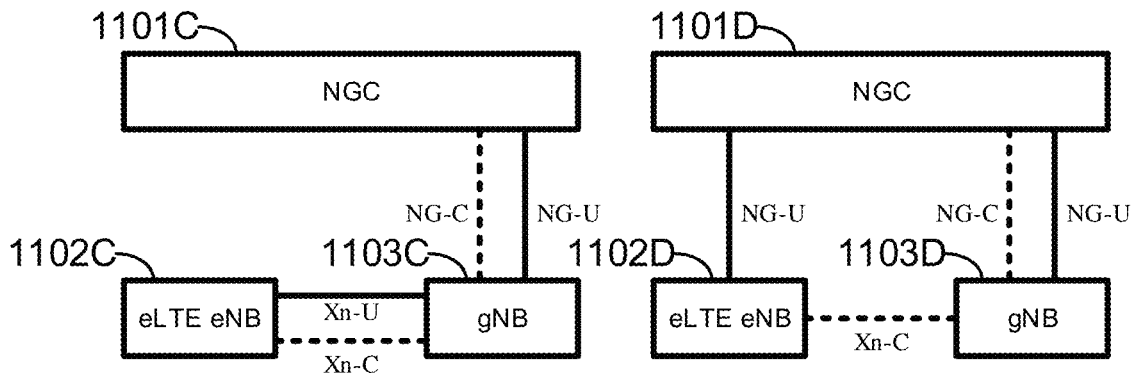

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

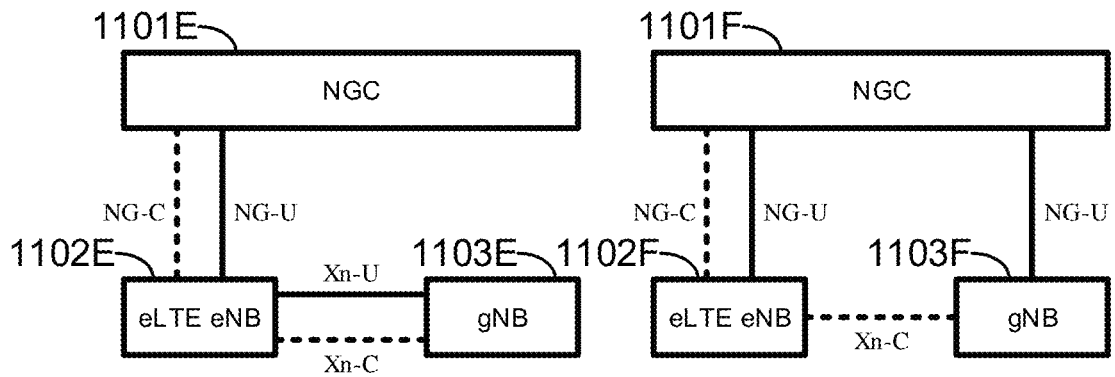

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

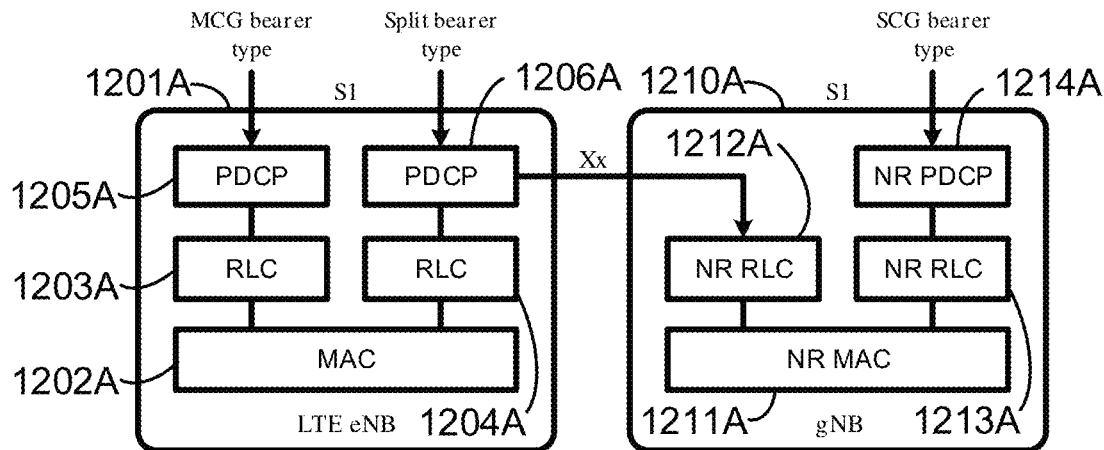
FIG. 12A Radio protocol architecture for split bearer and SCG bearer. LTE eNB connected to EPC with non-standalone gNB.
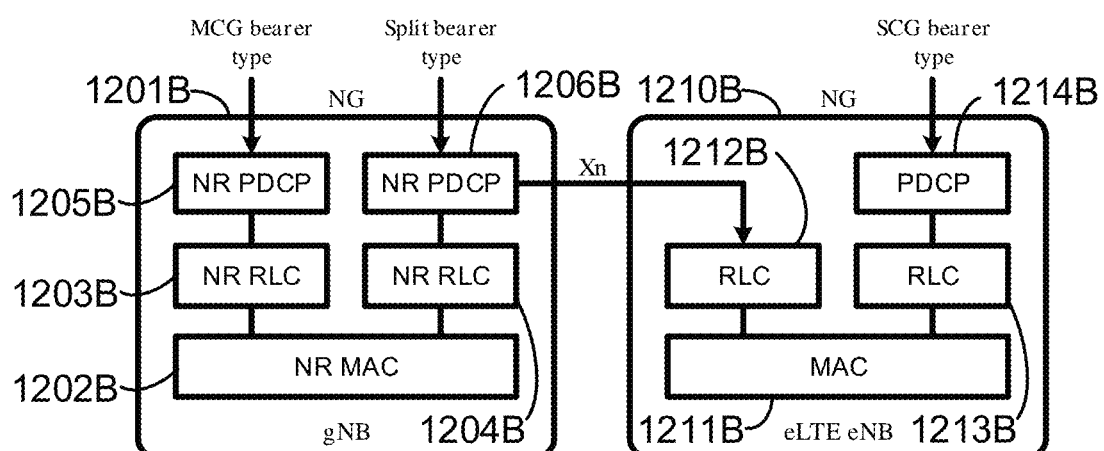
FIG. 12B Radio protocol architecture for split bearer and SCG bearer. gNB connected to NGC with non-standalone eLTE eNB.
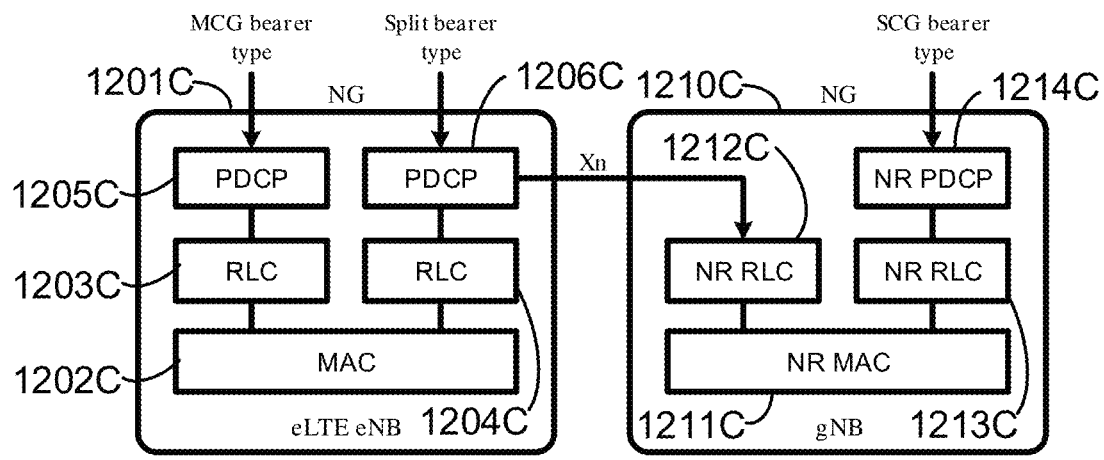
FIG. 12C Radio protocol architecture for split bearer and SCG bearer. eLTE eNB connected to NGC with non-standalone gNB.

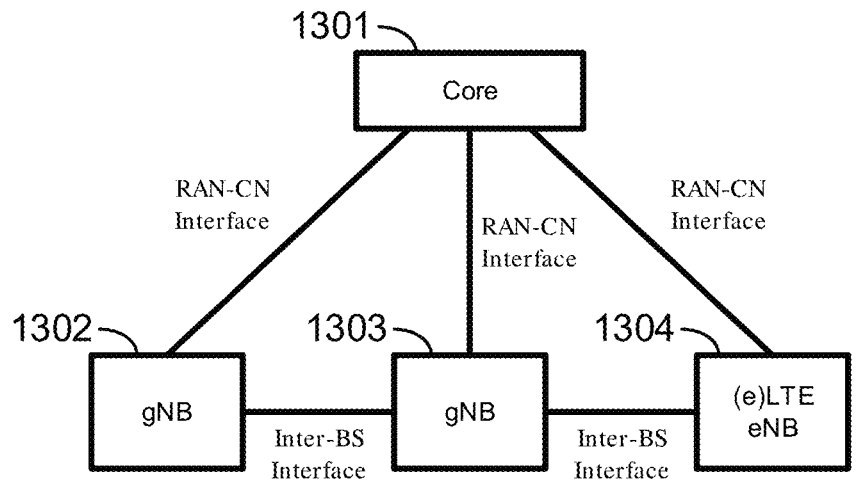
FIG. 13A Non-centralized deployment
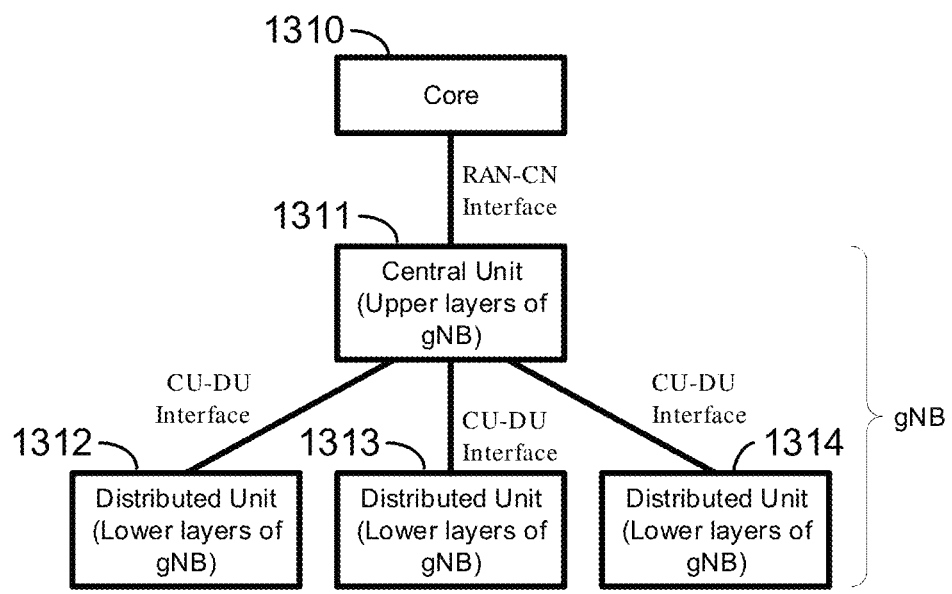
FIG. 13B Centralized deployment

TRANSMISSION POWER CONTROL FOR BEAM FAILURE RECOVERY REQUESTS

CROSS-REFERENCE TO RELATED APPLICATIONS

This application claims the benefit of U.S. Provisional Application No. 62/543,821, titled "Transmission Power of BFR Request," which was filed on Aug. 10, 2017, and which is hereby incorporated by reference in its entirety.

BACKGROUND

In wireless communications, beam failure recovery may be performed upon detecting a beam failure. Difficulties may arise in determining a transmission power for a beam failure recovery preamble to provide a sufficient likelihood that it is received.

SUMMARY

The following summary presents a simplified summary of certain features. The summary is not an extensive overview and is not intended to identify key or critical elements.

Systems, apparatuses, and methods are described for communications associated with beam failure recovery. A base station may determine a received target power for a beam failure recovery preamble and increase the likelihood that the base station will receive the beam failure recovery preamble. The received target power for the beam failure recovery preamble may be different from a received target power for a random access preamble. The base station may transmit, to the wireless device, one or more messages comprising configuration parameters. The configuration parameters may comprise an indication of the received target power for the beam failure recovery preamble. The wireless device may detect a beam failure. After detecting a beam failure, the wireless device may transmit a beam failure recovery request preamble using a transmission power based on the indication of the received target power.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
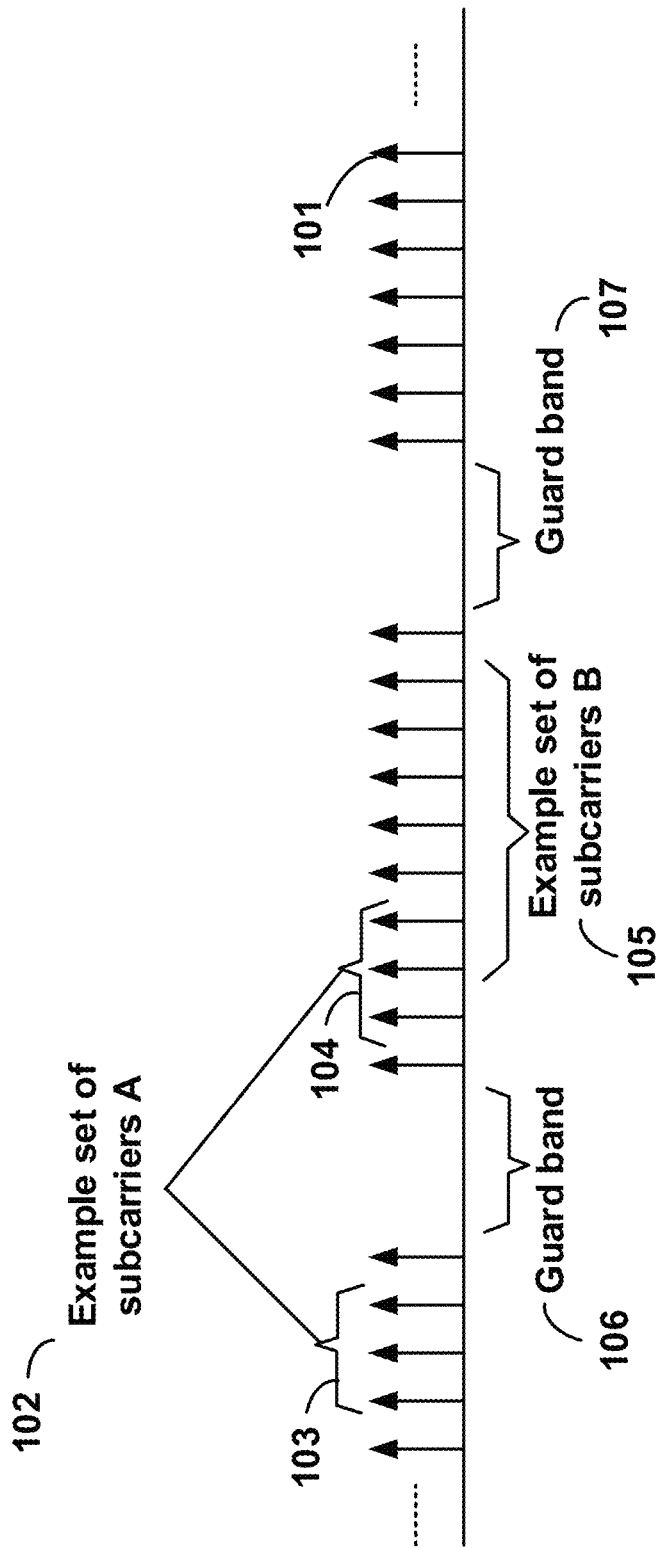
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to beam failure recovery in a multicarrier communication system.

The following acronyms are used throughout the present disclosure, provided below for convenience although other acronyms may be introduced in the detailed description:
3GPP 3rd Generation Partnership Project
5G 5th generation wireless systems
5GC 5G Core Network
ACK Acknowledgement
AMF Access and Mobility Management Function
ASIC application-specific integrated circuit
BFR beam failure recovery
BPSK binary phase shift keying
CA carrier aggregation
CC component carrier CDMA code division multiple access
CP cyclic prefix
CPLD complex programmable logic devices
CSI channel state information
CSS common search space
CU central unit
DC dual connectivity
DCI downlink control information
DFTS-OFDM discrete fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
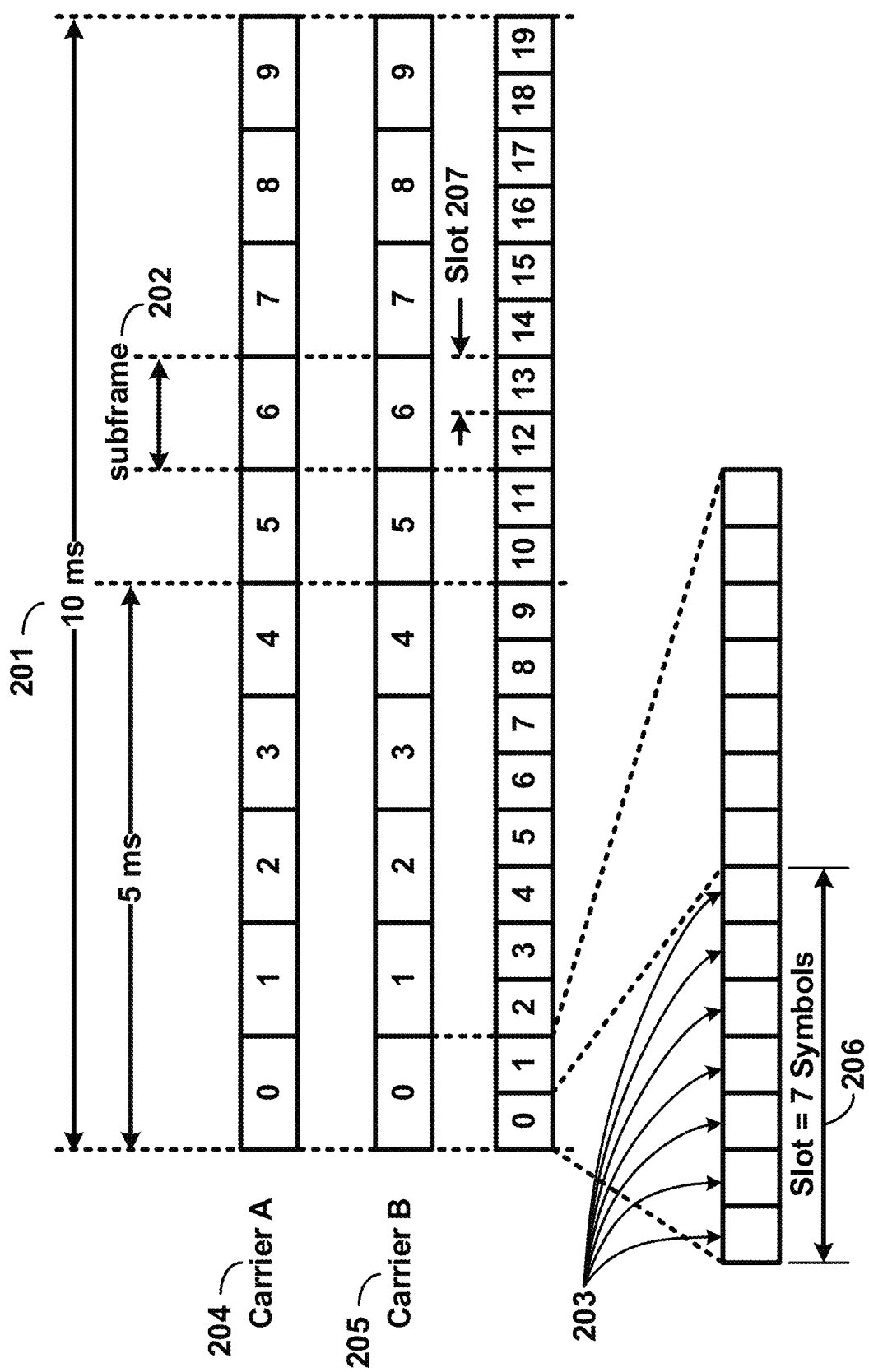
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
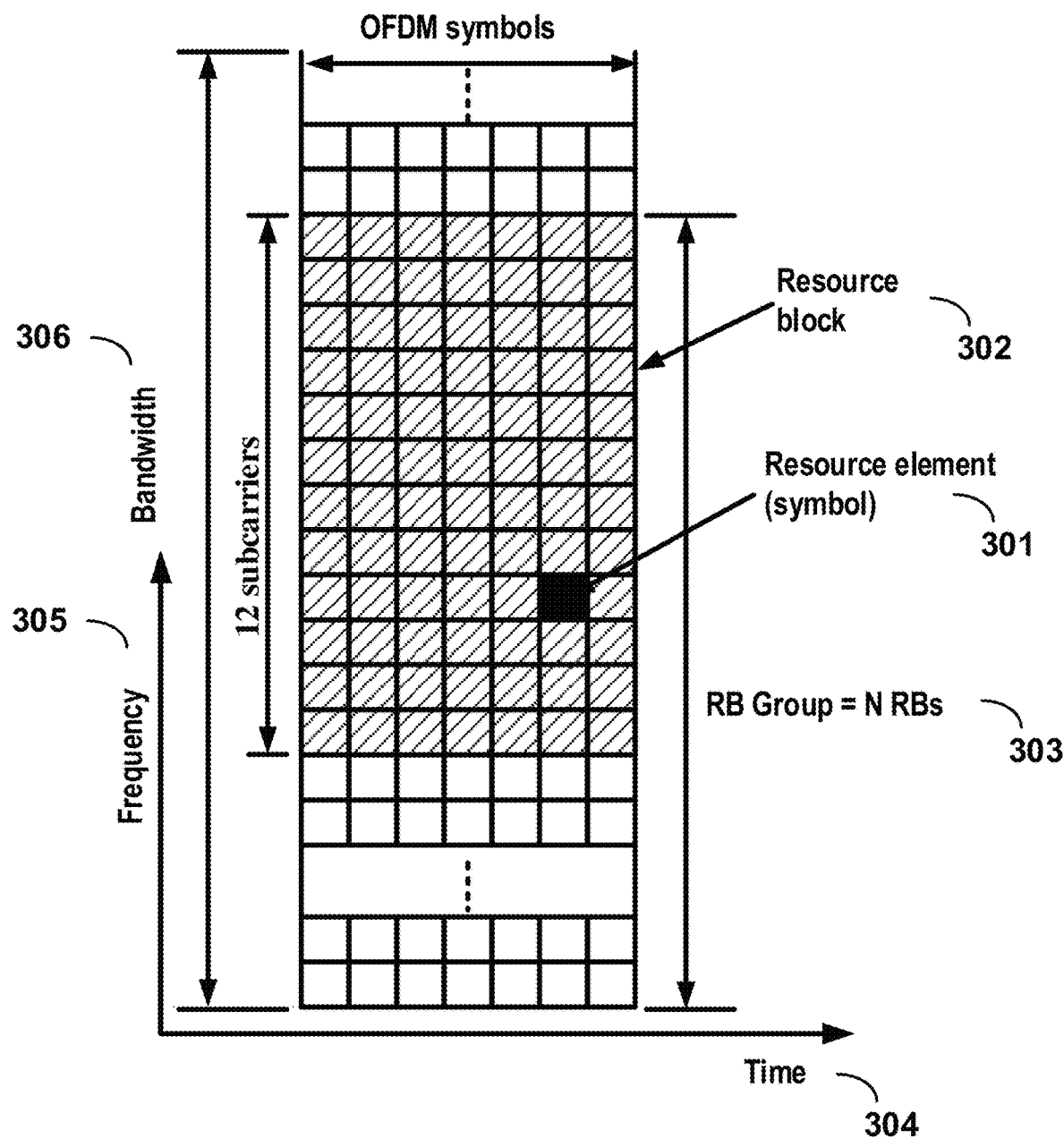
FIG. 3 shows example OFDM radio resources.

FIG. 3 shows an example of OFDM radio resources, including a resource grid structure in time 304 and frequency 305. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
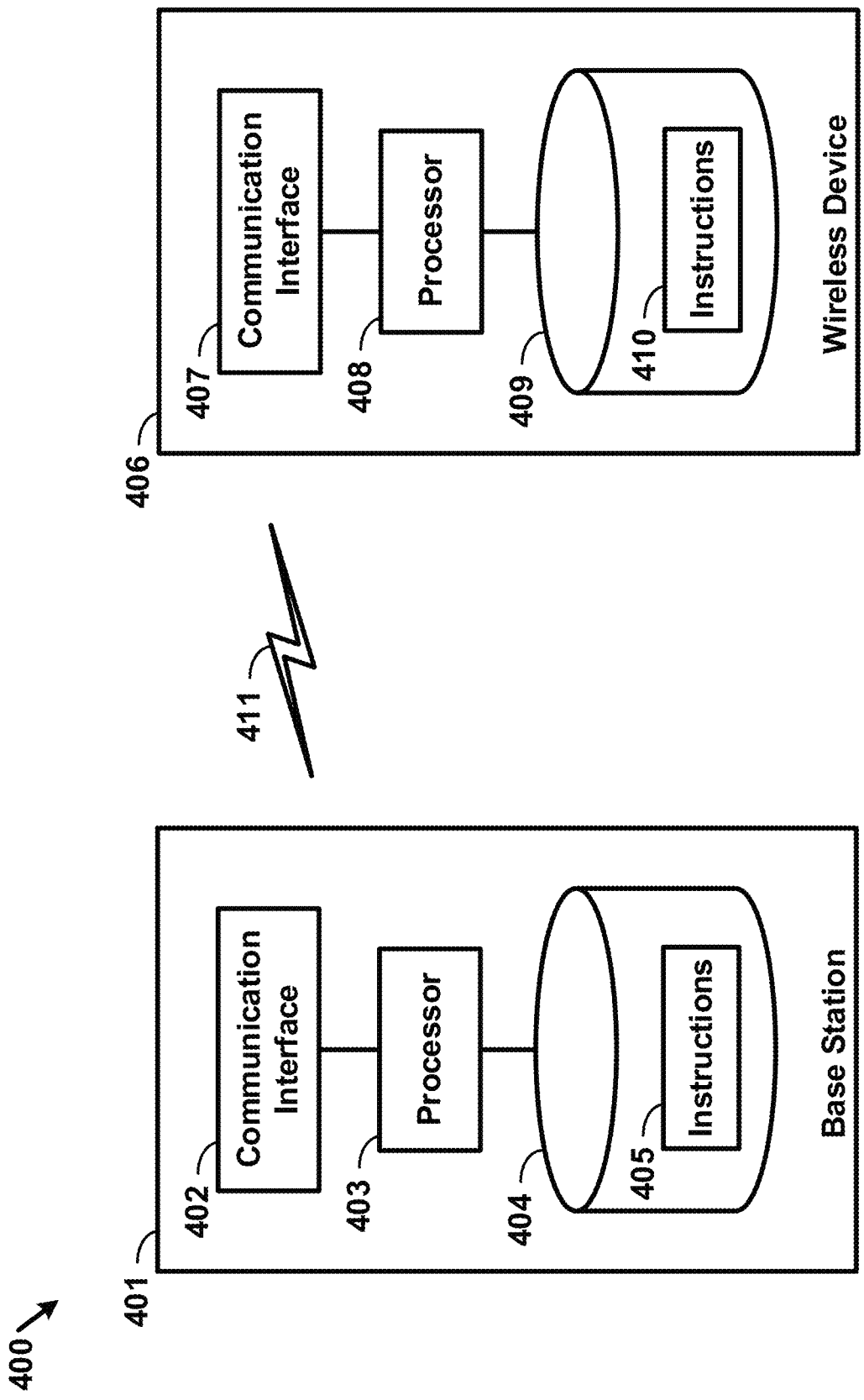
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB 1 establishment. The RRC connection establishment procedure may be used to transfer the initial NAS dedicated information message from a wireless device to E-UTRAN. The RRCConnectionReestablishment message may be used to re-establish SRB 1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
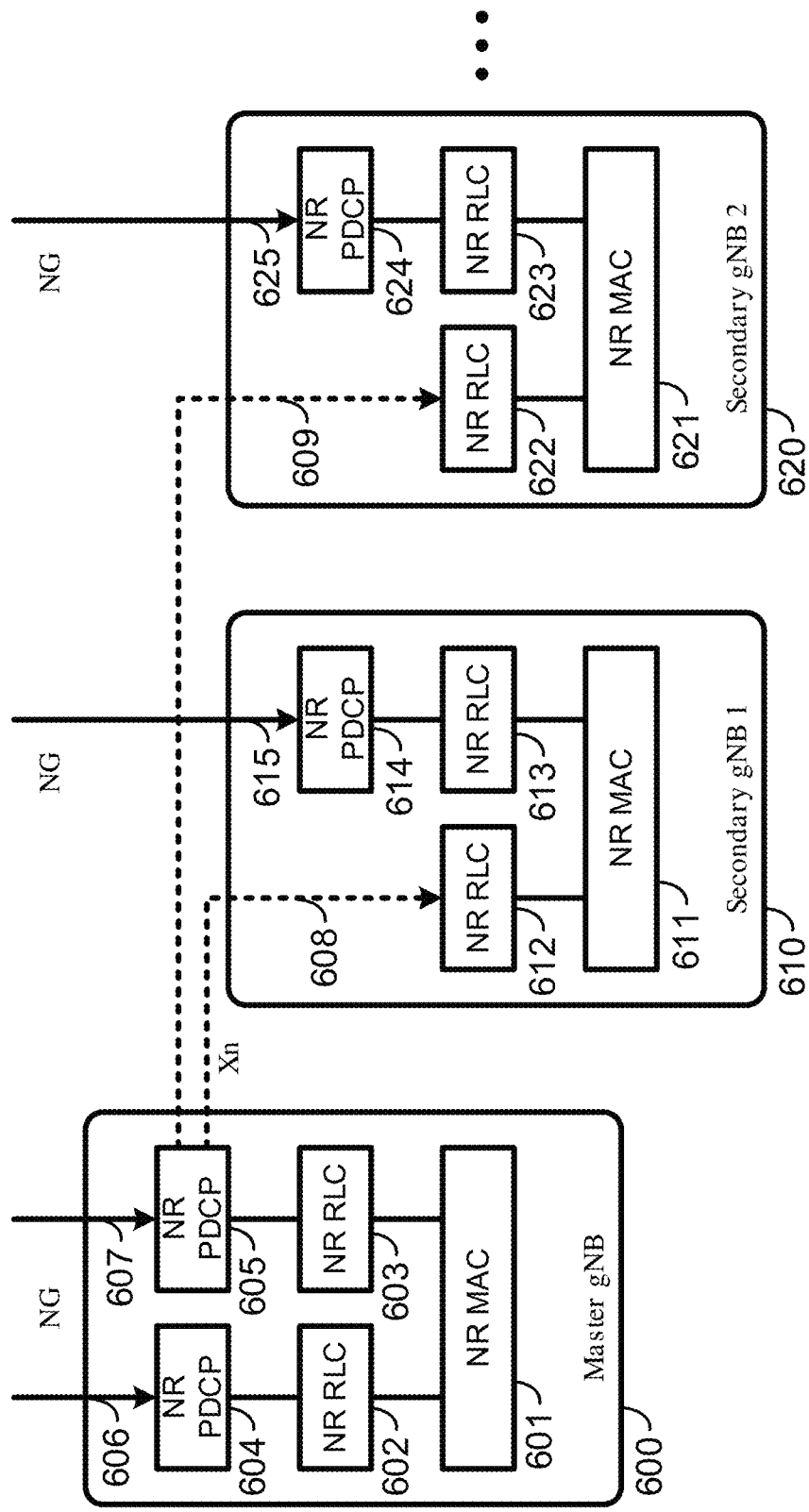
FIG. 6 shows an example protocol structure with multi-connectivity.
Figure 7:
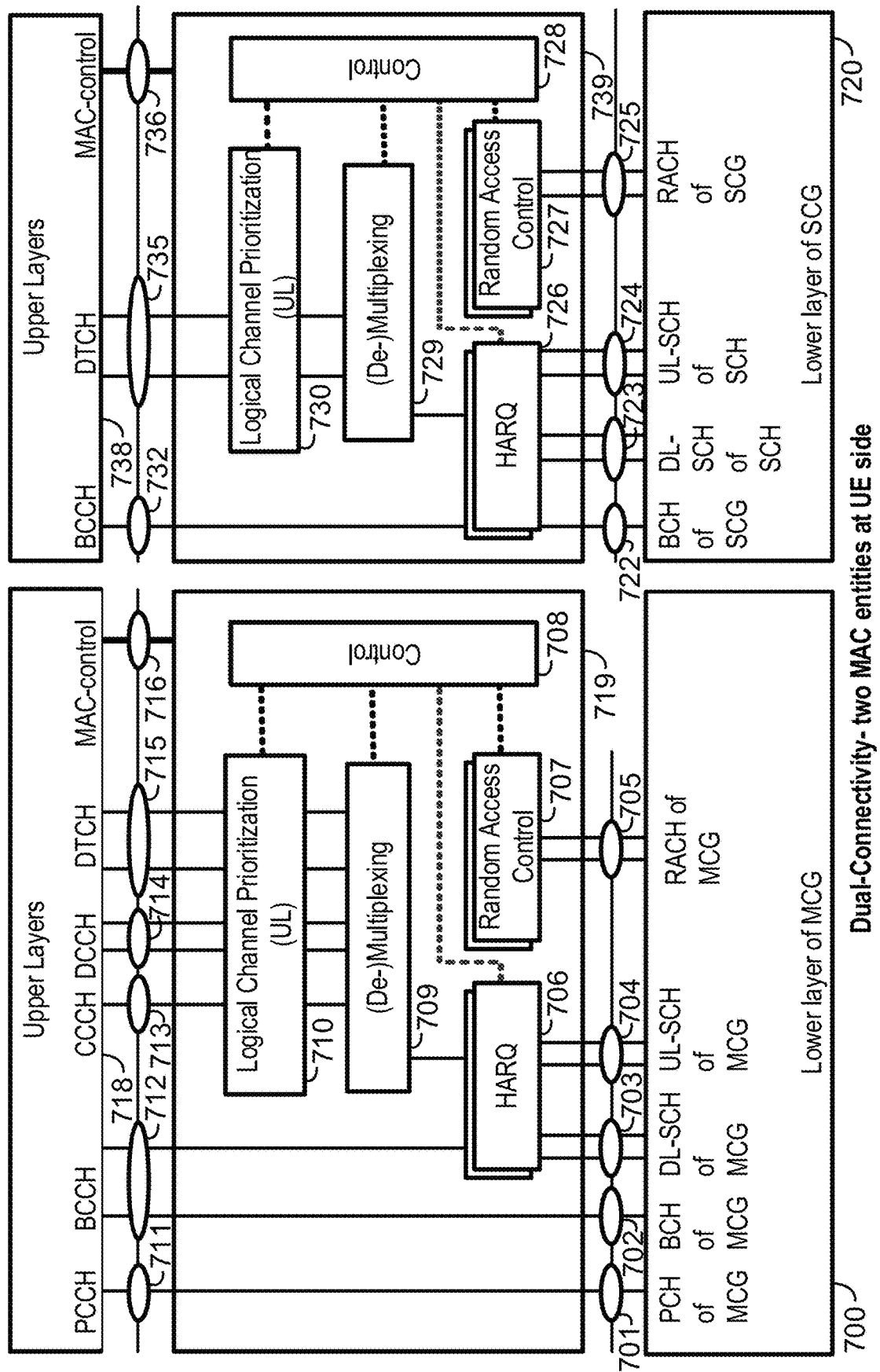
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNB s may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
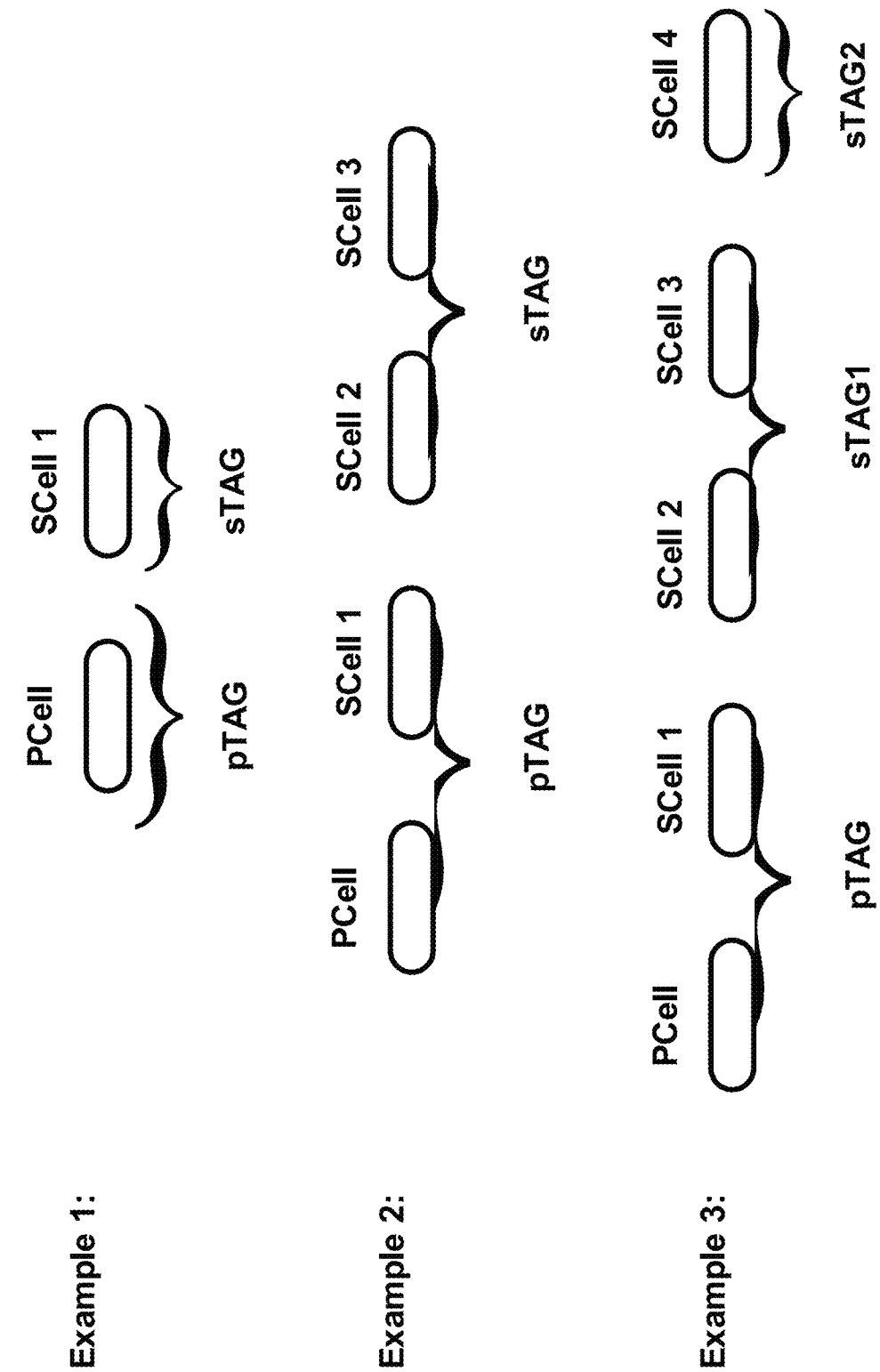
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
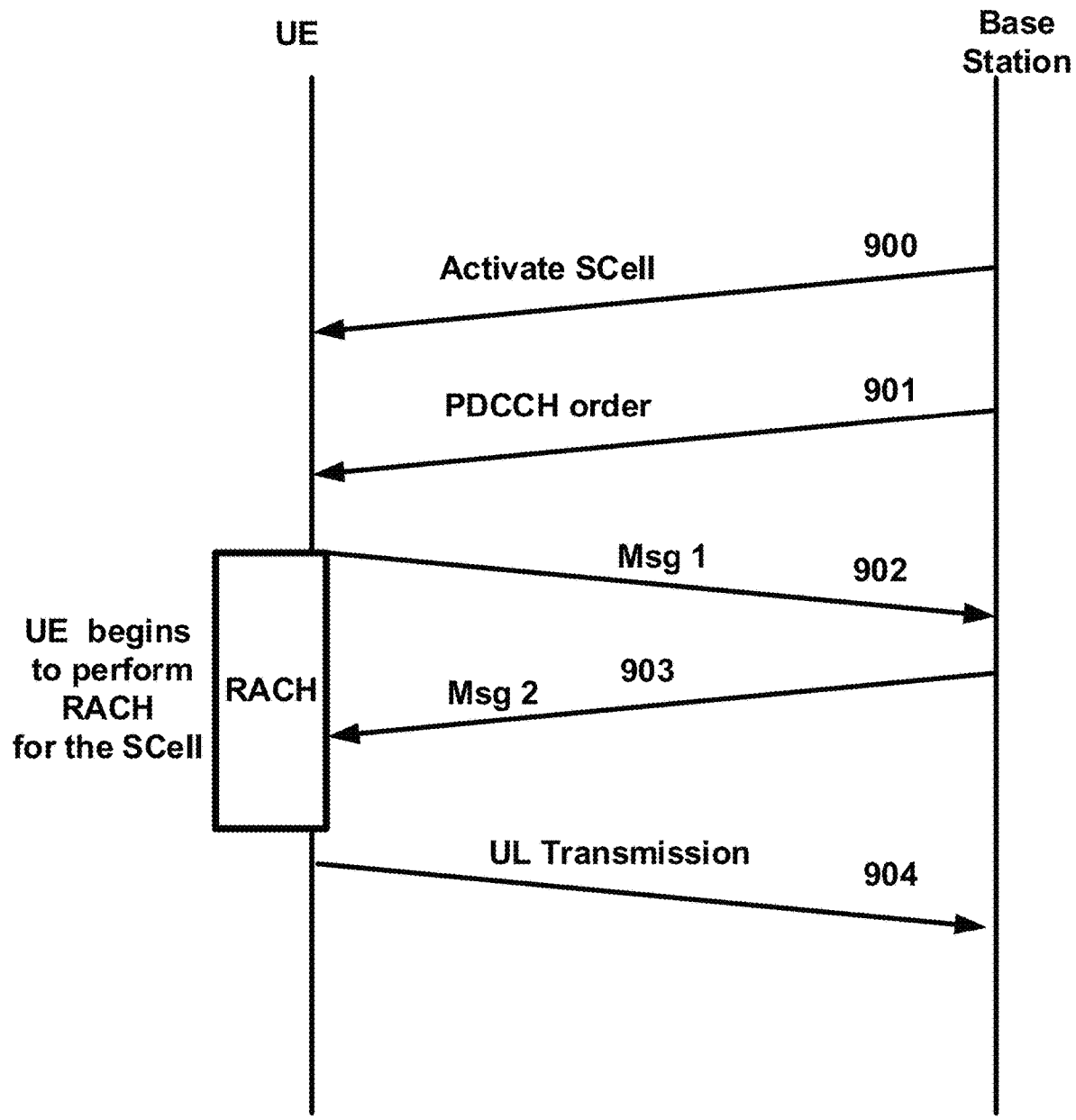
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
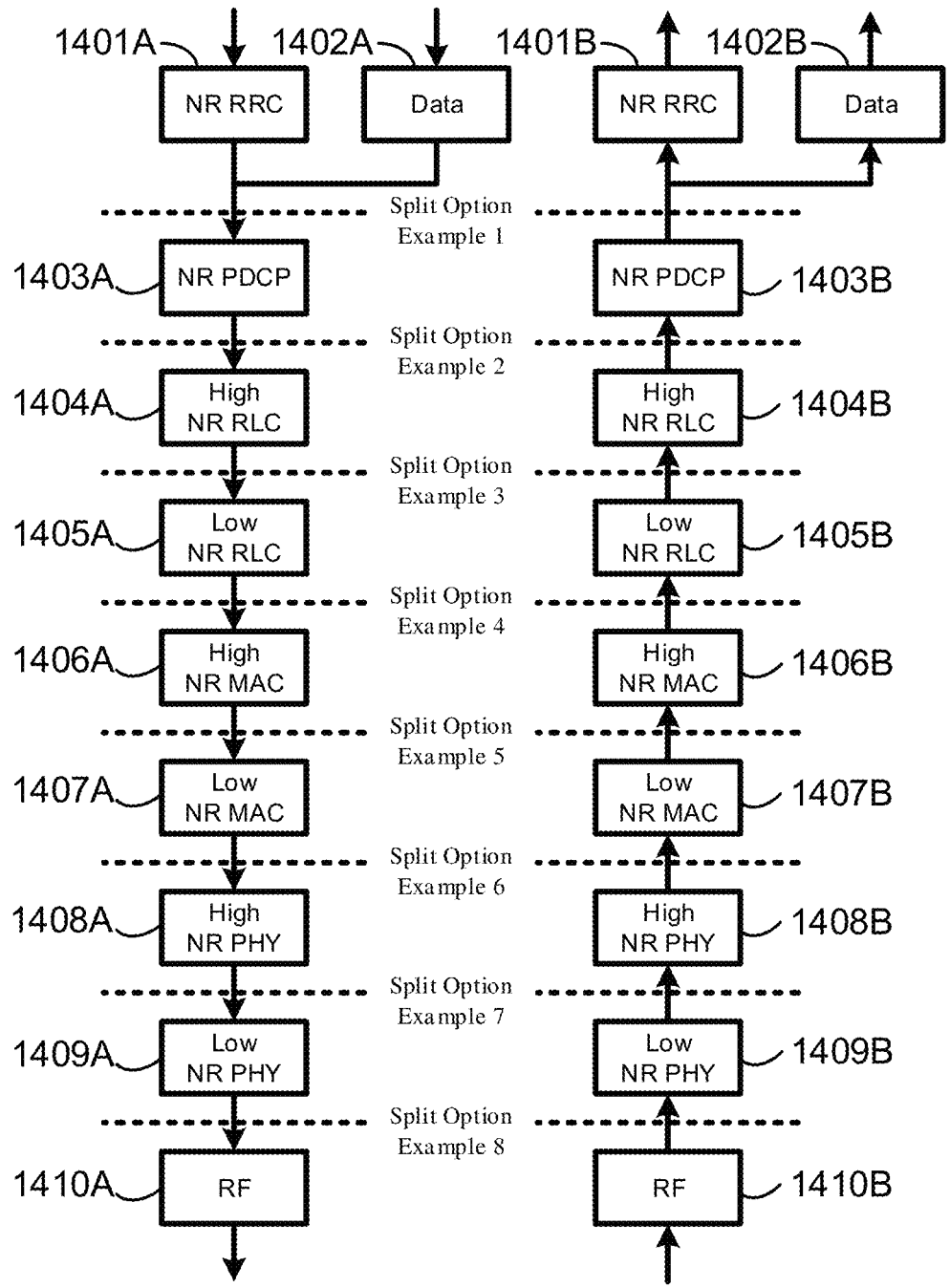
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure event occurs, e.g., such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, e.g., in a NR (New Radio) system. In a multi-beam example, a base station (e.g., a gNB in NR) may perform a downlink beam sweep to provide coverage for DL synchronization signals (SSs) and common control channels. Wireless devices may perform uplink beam sweeps for UL direction to access a cell. In a single beam example, a base station may configure time-repetition within one synchronization signal (SS) block. This time-repetition may comprise, e.g., one or more of a primary synchronization signal (PSS), a secondary synchronization signal (SSS), and a physical broadcast channel (PBCH). These signals may be in a wide beam. In a multi-beam examples, a base station may configure one or more of these signals and physical channels, such as an SS Block, in multiple beams. A wireless device may identify, e.g., from an SS block, an OFDM symbol index, a slot index in a radio frame, and a radio frame number.

Figure 15:
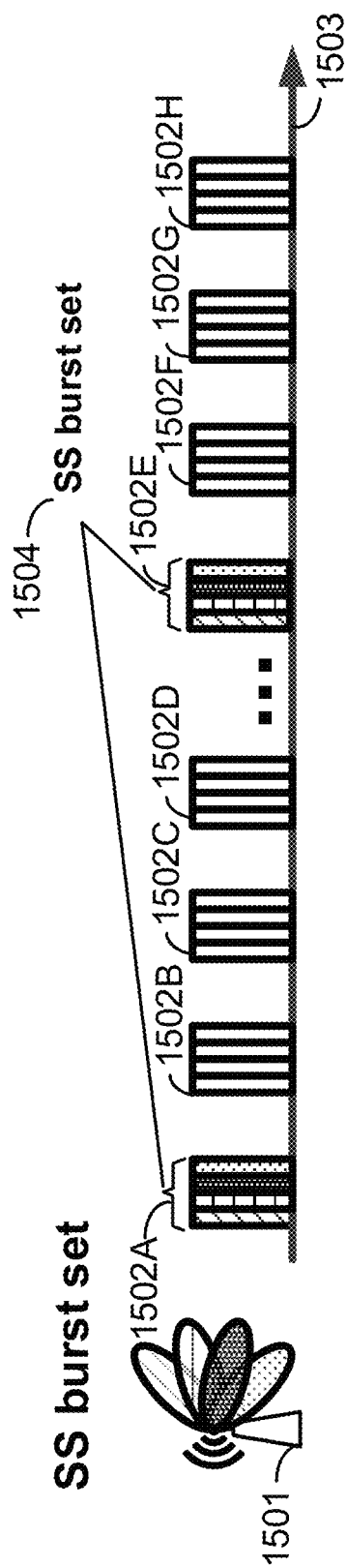
FIG. 15 shows an example of a synchronization signal burst set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. A beam may have a steering direction. If multiple SS bursts transmit beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
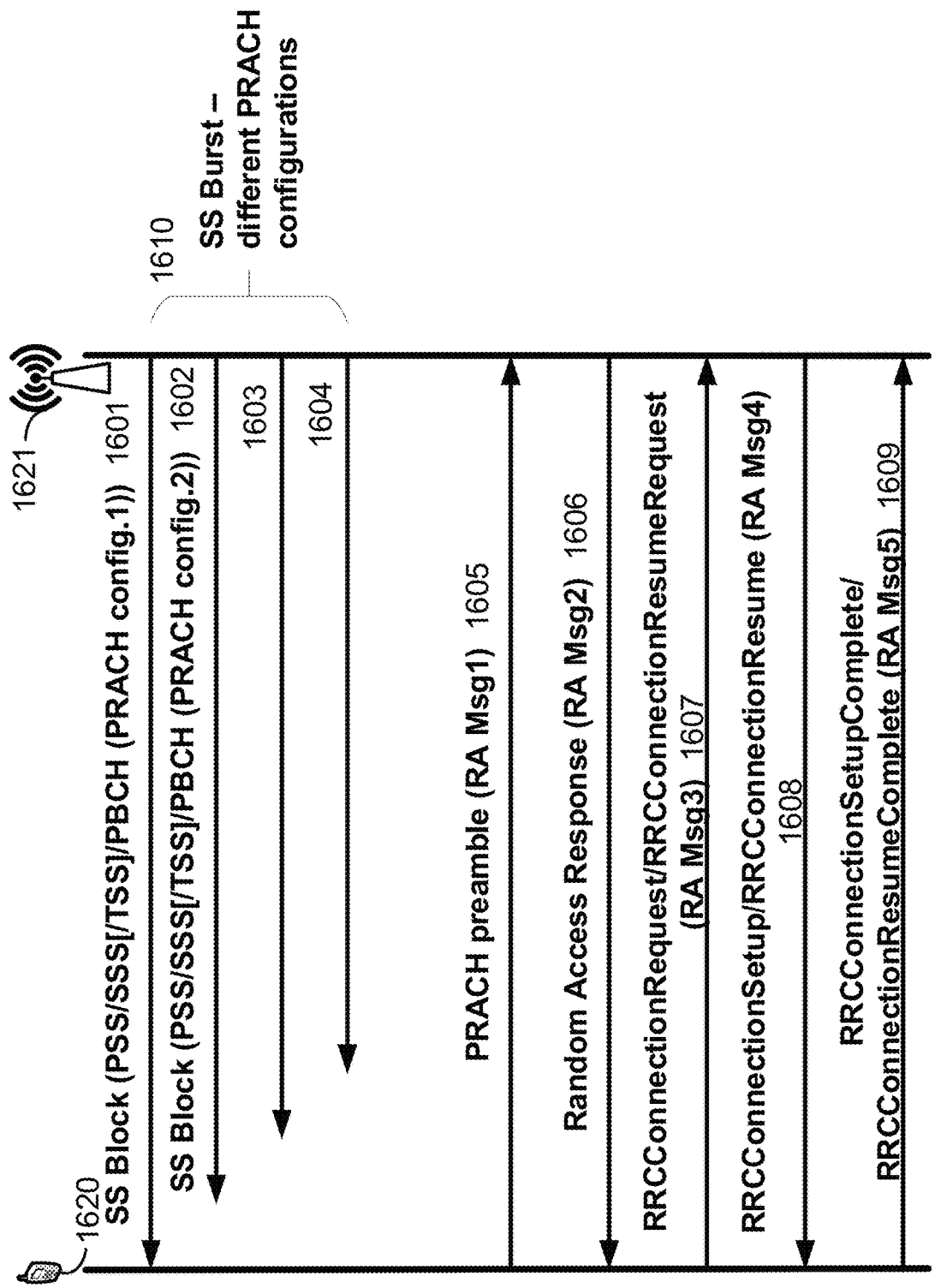
FIG. 16 shows an example of a random access procedure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1621 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any number of SS blocks may be sent in the same manner in addition to, or replacing, steps 1603 and 1604. An SS burst may comprise any number of SS blocks. For example, SS burst 1610 comprises the three SS blocks sent during steps 1602-1604.

The wireless device 1620 may send to the base station 1621 a preamble, at step 1605, e.g., after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, e.g., after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, e.g., after or in response to receiving the RAR. The base station 1621 may send to the wireless device 1620 an RRCConnectionSetup and/or RRCConnectionResume message, which may be referred to as RA Msg4, at step 1608, e.g., after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, e.g., after or in response to receiving the RRCConnectionSetup and/or RRCConnectionResume. An RRC connection may be established between the wireless device 1620 and the base station 1621, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 17:
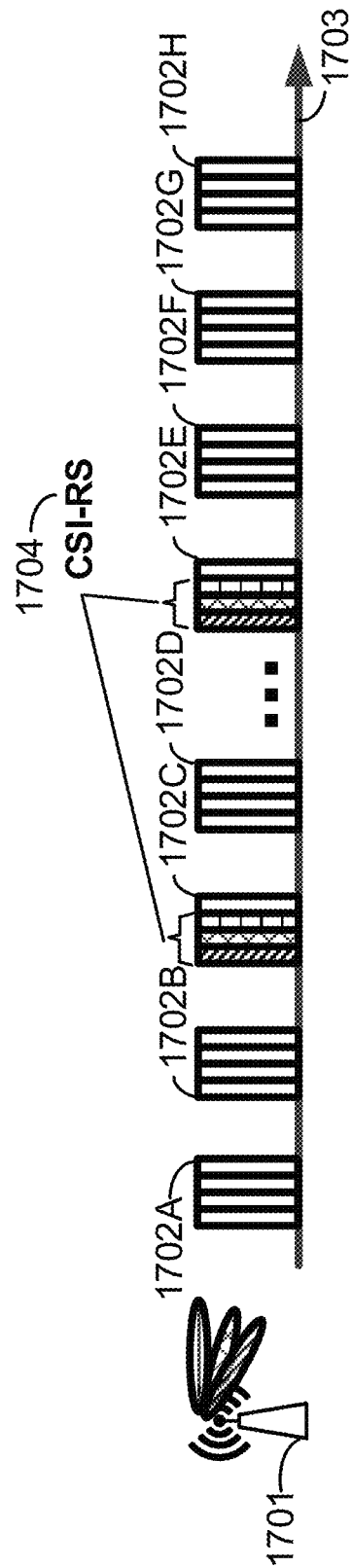
FIG. 17 shows an example of transmitting channel state information reference signals periodically for a beam.

FIG. 17 shows an example of transmitting CSI-RSs periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 18:
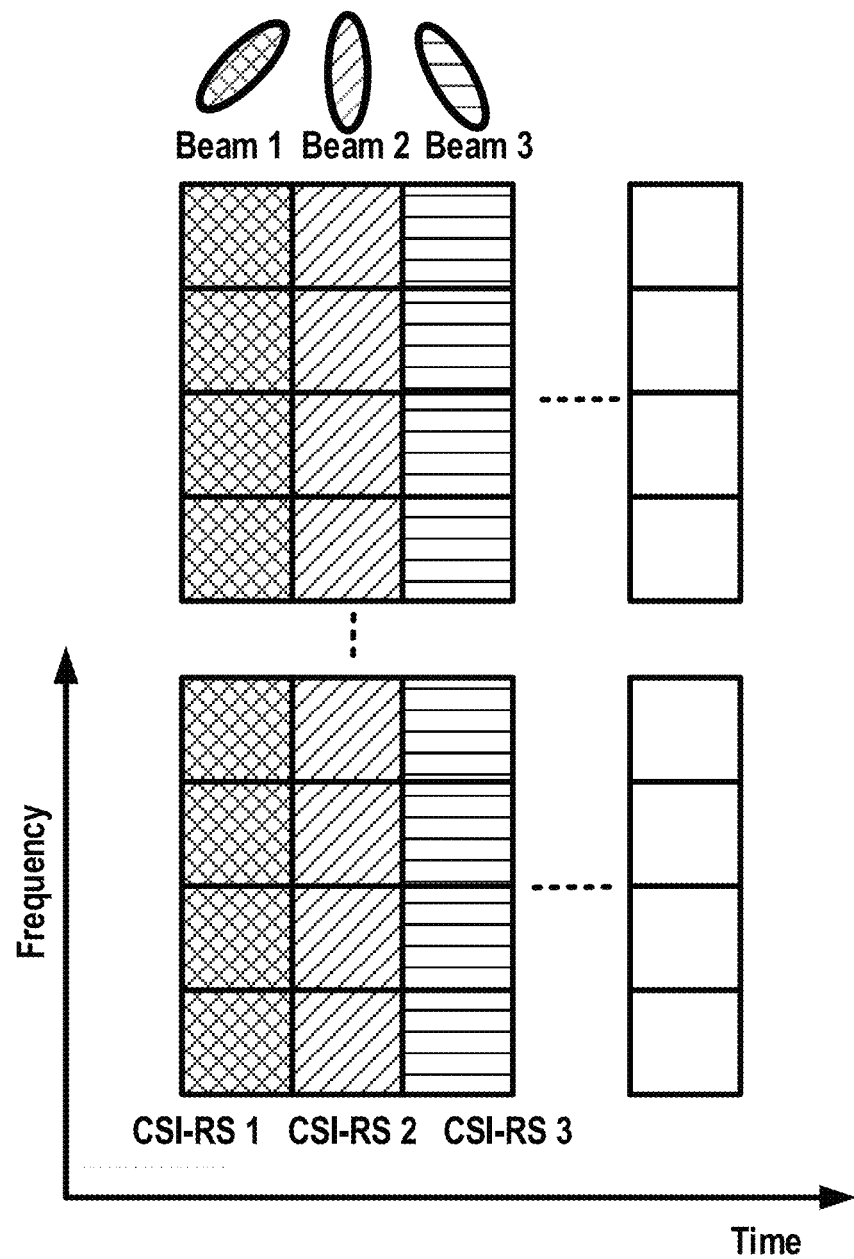
FIG. 18 shows an example of a channel state information reference signal mapping.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more RRC messages comprising CSI-RS parameters for one or more CSI-RS. CSI-RS parameters for a CSI-RS may comprise, e.g., time and OFDM frequency parameters, port numbers, CSI-RS index, and/or CSI-RS sequence parameters. Time and frequency parameters may indicate, e.g., periodicity, subframes, symbol numbers, OFDM subcarriers, and/or other radio resource parameters. CSI-RS may be configured using common parameters, e.g., when a plurality of wireless devices receive the same CSI-RS signal. CSI-RS may be configured using wireless device dedicated parameters, e.g., when a CSI-RS is configured for a specific wireless device.

As shown in FIG. 18, three beams may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

A base station and/or a wireless device may perform a downlink L1/L2 beam management procedure. One or more downlink L1/L2 beam management procedures may be performed within one or multiple transmission and receiving points (TRPs). Procedure P-1 may be used to enable a wireless device measurement on different TRP transmit (Tx) beams, e.g., to support a selection of TRP Tx beams and/or wireless device receive (Rx) beam(s). Beamforming at a TRP may include, e.g., an intra-TRP and/or inter-TRP Tx beam sweep from a set of different beams. Beamforming at a wireless device, may include, e.g., a wireless device Rx beam sweep from a set of different beams. Procedure P-2 may be used to enable a wireless device measurement on different TRP Tx beams, e.g., which may change inter-TRP and/or intra-TRP Tx beam(s). Procedure P-2 may be performed, e.g., on a smaller set of beams for beam refinement than in procedure P-1. P-2 may be a particular example of P-1. P-3 may be used to enable a wireless device measurement on the same TRP Tx beam, e.g., to change a wireless device Rx beam if a wireless device uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device (e.g., a UE) and/or a base station (e.g., a gNB) may trigger a beam failure recovery mechanism. A wireless device may trigger a beam failure recovery (BFR) request transmission, e.g., when a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

A wireless device may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. A quality of a beam pair link may be based on one or more of an RSRP value, reference signal received quality (RSRQ) value, and/or CSI value measured on RS resources. A base station may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to a wireless device, and the channel characteristics from a transmission via a control channel to the wireless device, are similar or the same under a configured criterion.

Figure 19:
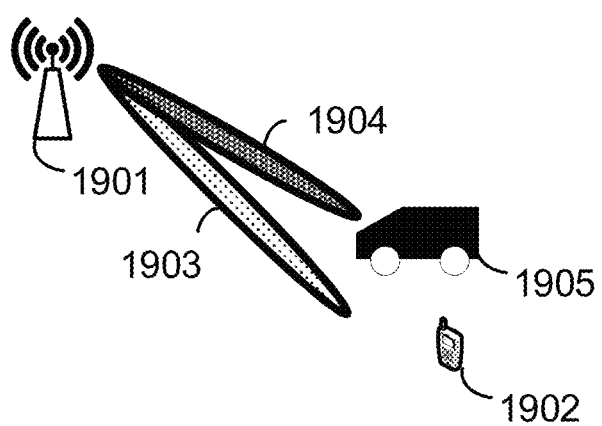
FIG. 19 shows an example of a beam failure event involving a single transmission and receiving point.

FIG. 19 shows an example of a beam failure event involving a single TRP. A single TRP such as at a base station 1901 may transmit, to a wireless device 1902, a first beam 1903 and a second beam 1904. A beam failure event may occur if, e.g., a serving beam, such as the second beam 1904, is blocked by a moving vehicle 1905 or other obstruction (e.g., building, tree, land, or any object) and configured beams (e.g., the first beam 1903 and the second beam 1904), including the serving beam, are received from the single TRP. The wireless device 1902 may trigger a mechanism to recover from beam failure when a beam failure occurs.

Figure 20:
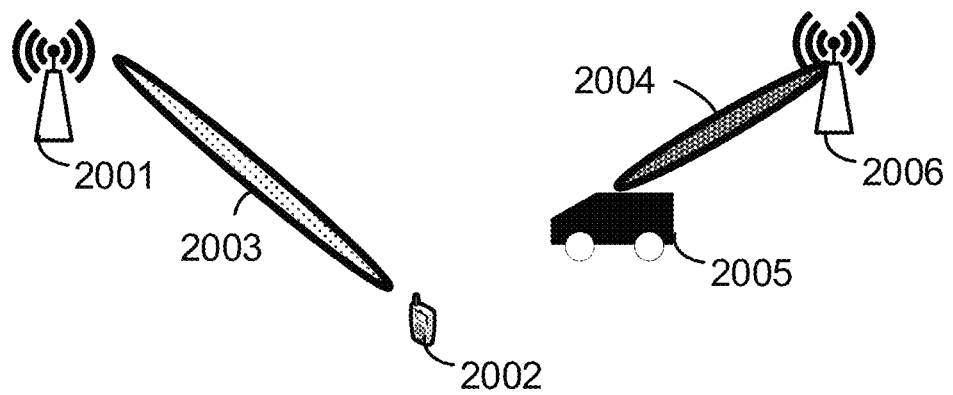
FIG. 20 shows an example of a beam failure event involving multiple transmission and receiving points.

FIG. 20 shows an example of a beam failure event involving multiple TRPs. Multiple TRPs, such as at a first base station 2001 and at a second base station 2006, may transmit, to a wireless device 2002, a first beam 2003 (e.g., from the first base station 2001) and a second beam 2004 (e.g., from the second base station 2006). A beam failure event may occur when, e.g., a serving beam, such as the second beam 2004, is blocked by a moving vehicle 2005 or other obstruction (e.g., building, tree, land, or any object) and configured beams (e.g., the first beam 2003 and the second beam 2004) are received from multiple TRPs. The wireless device 2002 may trigger a mechanism to recover from beam failure when a beam failure occurs.

A wireless device may monitor a PDCCH, such as a New Radio PDCCH (NR-PDCCH), on M beam pair links simultaneously, where M>1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbols.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A wireless device may transmit a preamble during a normal random access (RA) procedure or during a beam failure recovery (BFR) procedure. In the RA procedure, the wireless device may transmit the preamble to establish, or re-establish, synchronization with a base station, e.g., using a 4-step contention-based procedure, or a contention-free procedure. In the BFR procedure, the wireless device may transmit the preamble to recover a beam pair link between the base station and the wireless device. The BFR procedure (for example, using a 2-step and/or contention-free procedure) may be more urgent and/or important than the RA procedure. RA procedures may not provide a sufficient likelihood that beam failure is recovered timely, whereas the BFR procedure may provide a greater likelihood that beam failure is recovered in a timely and power-efficient manner.

A transmission power for a preamble in the RA procedure may differ from a transmission power for a preamble in the BFR procedure. For example, a preamble of the BFR procedure may be transmitted using a transmission power that may exceed the transmission power for a preamble of a RA procedure and that may increase the likelihood that the preamble of the BFR procedure is received by a base station. The base station may configure these different transmission powers, e.g., by sending a first target received power for the preamble of the RA procedure and a second target received power for the preamble of the BFR procedure.

A wireless device may receive, from a base station, one or more radio resource control messages comprising configuration parameters of a cell. The configuration parameters may comprise a first preamble received target power value of the cell for a first random access procedure of a beam failure recovery procedure, and a second preamble received target power value of the cell for a second random access procedure. The configuration parameters may further comprise at least one of: a channel state information reference signal, a synchronization signal block, or a demodulation reference signal for a physical broadcast channel. The wireless device may measure, based on one or more first reference signal resources, a beam link quality. The wireless device may determine, based on the measured beam link quality, at least one beam failure. Based on determining the at least one beam failure, the wireless device may: initiate the beam failure recovery procedure, and initiate the first random access procedure. Based on detecting a beam failure of the cell, the wireless device may transmit, using a first transmission power that is based on the first preamble received target power value of the cell, a first preamble for the first random access procedure of the cell. The wireless device may determine the first transmission power by adding the first preamble received target power value and a preamble format parameter. The preamble format parameter may indicate a power offset value. The wireless device may determine the first transmission power based on a first reference signal power value and a first path loss value. This first path loss value may be based on a layer 1 reference signal received power value. The layer 1 reference signal received power value may be obtained based on a first reference signal associated with a serving beam. The layer 1 reference signal received power value may be obtained based on a second reference signal associated with a candidate beam. The wireless device may transmit, using a second transmission power that is based on the second preamble received target power value of the cell, a second preamble for the second random access procedure of the cell. The wireless device may select at least one reference signal resource, e.g., after or in response to receiving a physical downlink control channel order. The wireless device may transmit the second preamble after or in response to receiving a physical downlink control channel order. The wireless device may transmit the second preamble after or in response to initiating the second random access procedure for uplink synchronization.

A base station may transmit, to a wireless device one or more radio resource control messages comprising configuration parameters of a cell. The configuration parameters may comprise a first preamble received target power value of the cell for a first random access procedure of a beam failure recovery procedure, and a second preamble received target power value of the cell for a second random access procedure. The configuration parameters may further comprise at least one of: a channel state information reference signal, a synchronization signal block, or a demodulation reference signal for a physical broadcast channel. The base station may receive, from the wireless device using a first transmission power based on the first preamble received target power value of the cell, a first preamble for the first random access procedure of the cell. The first transmission power may comprise a sum of the first preamble received target power value and a preamble format parameter. The preamble format parameter may indicate a power offset value. The first transmission power may be based on to a first reference signal power value and a first path loss value. The first path loss value may be calculated based on a layer 1 reference signal received power value. The base station may receive from the wireless device using a second transmission power based on to the second preamble received target power value of the cell, a second preamble for the second random access procedure of the cell. The base station may determine, based on receiving the first preamble for the first random access procedure of the cell, at least one beam failure. After determining the at least one beam failure, the base station may: proceed with a beam failure recovery procedure, and proceed with the first random access procedure (e.g., by transmitting a downlink control information in response to the first preamble). The base station may successfully complete the BFR procedure. The base station may transmit a physical downlink control channel order, e.g., after or before receiving the second preamble.

A wireless device may receive, from a base station, one or more radio resource control messages comprising configuration parameters that comprise a first target power value for a beam failure recovery procedure, and a second target power value for a second random access procedure. The configuration parameters may further comprise at least one of: a channel state information reference signal, a synchronization signal block, or a demodulation reference signal for a physical broadcast channel. The wireless device may detect a failure of a first beam. The wireless device may transmit, using a first transmission power that is based on the first target power value, a first preamble for the beam failure recovery procedure. The wireless device may determine the first transmission power by adding the first target power value and a preamble format parameter. The preamble format parameter may indicate a power offset value. The wireless device may determine the first transmission power further based on a first reference signal power value and a first path loss value. The first path loss value may be based on a layer 1 reference signal received power value. The wireless device may receive a physical downlink control channel order. The wireless device may select at least one reference signal resource, e.g., after or in response to the receiving the physical downlink control channel order. The wireless device may transmit, using a second transmission power that is based on the second target power value, a second preamble for the second random access procedure. A system may comprise a wireless device and a base station.

A base station may transmit to a wireless device, and the wireless device may receive from the base station, at least one message, e.g., a radio resource control (RRC) message, comprising configuration parameters of one or more cells. The configuration parameters may comprise, e.g., one or more RS resources and/or one or more resource parameters. The RS resources may be for one or more reference signal received power (RSRP) measurements. The RS resources may comprise, e.g., channel state information reference signals (CSI-RSs), SS blocks, and/or DM-RSs of a PBCH. Each of the plurality of CSI-RSs may be associated with a beam. The resource parameters may comprise at least one of: a power offset value, one or more PRACH preambles, a PRACH format, a PRACH numerology, a time resource allocation, and/or a frequency resource allocation. The wireless device may receive a system information block comprising a preamble initial received target power value. The wireless device may detect that a beam, of at least one first beam associated with at least one first CSI-RS of a first CSI-RS group, satisfies at least a first criterion or a plurality of criteria. The wireless device may determine a preamble power for a first preamble. The preamble power may be determined employing at least one of: the offset value; the preamble initial received target power value; a power parameter based on one or more power control commands received from a base station; and/or a path loss measurement value obtained based on a beam associated with a RACH employed for preamble transmission.

Figure 21:
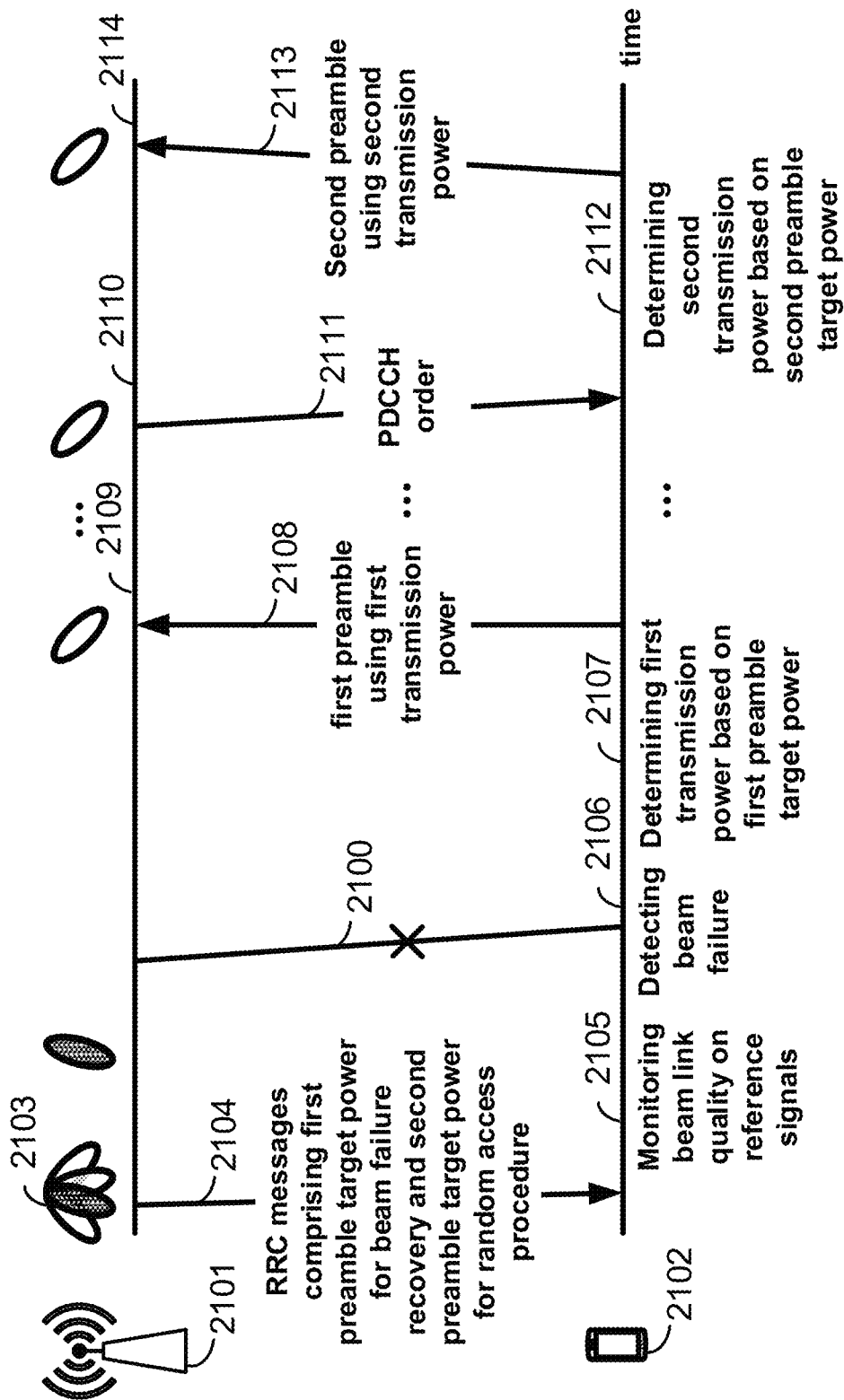
FIG. 21 shows an example of a beam failure event and transmissions of first and second preambles.

FIG. 21 shows example procedures for BFR using a BFR preamble transmission power that may differ from an RA preamble transmission power. At step 2103, a base station 2101 may determine configuration parameters for one or more wireless devices, such as a wireless device 2102. The configuration parameters may comprise a plurality of target power values for a corresponding plurality of preambles. The plurality of target power values may comprise a first target power value for a BFR preamble and a second target power value for a RA preamble.

The base station 2101 may determine, at step 2103, an initial target power value (e.g., an initial target received power) for an RA preamble transmission and/or for a BFR-PRACH preamble transmission, based on, e.g., one or more of at least: a preamble format, a measured uplink interference and noise level in the time/frequency resource allocated to one or more RA preambles and/or one or more BFR-PRACH preambles, power control commands, a desired received signal to interference plus noise ratio (SINR) for detecting an RA preamble and/or a BFR-PRACH preamble, a transmit power difference between SS blocks and CSI-RSs, and/or a transmit power difference between SS blocks and DM-RSs of a PBCH.

The base station 2101 may determine, at step 2103, a value of an additional power offset. The base station may determine, at step 2103, the BFR-PRACH preamble transmission power based on the determined initial target power value for an RA preamble transmission. For example, the BFR-PRACH transmission power may correspond to an RA preamble transmission power. Additionally or alternatively, the base station may determine, at step 2103, the BFR-PRACH preamble transmission power based on the determined initial target power value for an RA preamble transmission and the additional power offset. For example, the BFR-PRACH transmission power may correspond to the RA preamble transmission power plus the additional power offset. The configuration parameters of the BFR-PRACH may comprise an additional power offset by device-specific (e.g., wireless device-specific) or cell-specific RRC signaling. The additional power offset may indicate a power offset for a BFR-PRACH transmission above an amount of power for a normal PRACH transmission. The power offset may be based on, e.g., one or more of at least: a preamble format, a preamble numerology, a measured uplink interference and noise level in the time/frequency resource allocated to one or more RA preambles and/or one or more BFR-PRACH preambles, power control commands, a desired received signal to interference plus noise ratio (SINR) for detecting an RA preamble and/or a BFR-PRACH preamble, a transmit power difference between SS blocks and CSI-RSs, or between SS blocks and DM-RSs of a PBCH.

The base station may determine, e.g., at step 2103, a first type of RSs for channel quality measurement of initial access, and a second type of RSs for channel quality measurement of BFR request. For example, the wireless device 2102 may employ initial access based on channel quality measurement on SS blocks, and/or the wireless device may employ a BFR request transmission based on channel quality measurement on CSI-RSs.

At step 2104, the base station 2101 may transmit, to the wireless device 2102, one or more messages comprising configuration parameters of an RA (e.g., RACH) procedure, e.g., via RRC signaling. The configuration parameters of the RA procedure may comprise, e.g., an initial received target power of a PRACH preamble. Additionally or alternatively, at step 2104, the base station 2101 may transmit, to the wireless device 2101, one or more messages comprising configuration parameters of a BFR procedure, e.g., via RRC signaling. The configuration parameters of the BFR procedure may comprise, e.g., an initial received target power of a BFR-PRACH preamble. The configuration parameters of an RA procedure and/or the configuration parameters of a BFR procedure may comprise configuration parameters of at least one of the following: CSI-RS resources, QCL parameters between CSI-RS and DM-RS of a control channel (e.g., PBCH), transmission power values for CSI-RS resources, transmission powers of DM-RSs of a control channel (e.g., PBCH), SS blocks, transmission power of SS blocks, BFR-PRACH resources, initial received target power value of a BFR-PRACH, and/or an additional BFR-PRACH power offset. The base station 2101 may transmit the one or more messages, comprising the configuration parameters, via RRC signaling, MAC signaling, an L1 downlink control channel, wireless-device specific signaling, and/or other signaling. The configuration parameters of the normal RA procedure and the configuration parameters of the BFR procedure may be transmitted, by the base station 2101, in the same transmission or in separate transmissions.

Figure 22:
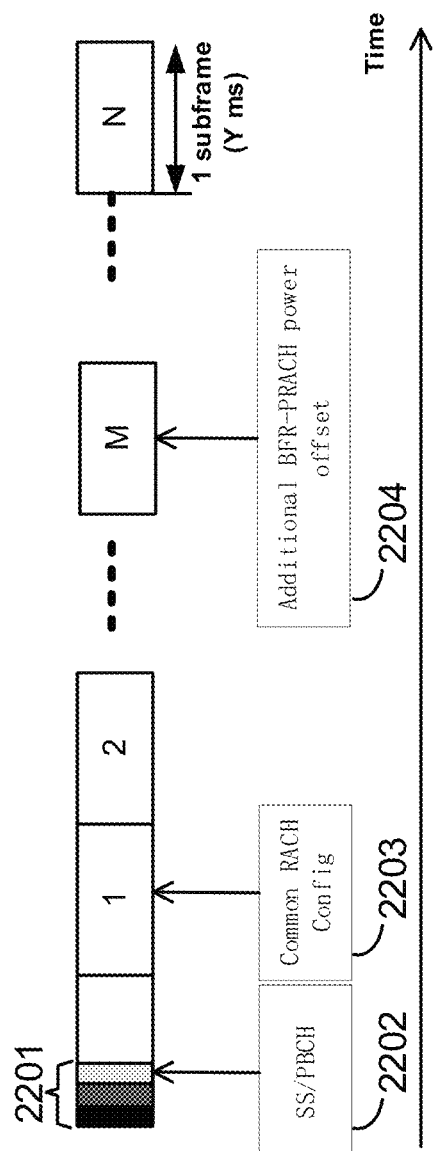
FIG. 22 shows an example transmission of configuration parameters.

FIG. 22 shows an example transmission, from the base station 2101 to the wireless device 2102, which may comprise the configuration parameters of an RA procedure and/or the configuration parameters of a BFR procedure. The transmission shown in FIG. 22 may be performed at step 2104 described above regarding FIG. 21. The transmission may comprise signals 2201 and a plurality (e.g., N number) of subframes. The signals 2201 may comprise one or more synchronization signals 2202. The one or more synchronization signals may be associated with a PBCH. The N number of subframes may comprise one or more RACH configuration parameters 2203 and/or one or more indications of additional BFR-BRACH power offset 2204. The transmission may comprise an RRC message.

At step 2105 of FIG. 21, the wireless device 2102 may monitor beam link quality on RSs. The wireless device 2102 may select one or more RS of which to monitor channel quality. The wireless device 2102 may perform RSRP measurements for one or more CSI-RSs associated with a beam, and/or the wireless device 2102 may perform RSRP measurements for multiple sets of one or more CSI-RSs with each set being associated with one of a plurality of beams.

At step 2106, the wireless device 2102 may detect a beam failure 2100. A beam failure may occur, e.g., when a quality of beam pair links, e.g., transmitting via a PDCCH, is determined to be below a threshold. The threshold may be predefined or configured, e.g., via an RRC message. The quality of beams may be based on the monitoring performed by the wireless device 2102 at step 2105.

At step 2107, the wireless device 2102 may determine a transmission power for a beam failure recovery (BFR) preamble, e.g., for a BFR-PRACH. The transmission power for the BFR preamble may be based on a preamble received target power that may be included in the configuration parameters from step 2104.

A preamble transmission power for an RA procedure (e.g., a PRACH) may be determined as follows:

$$P_{PRACH} = \min\{P_{CMAX,c}(i), \text{PREAMBLE\_RECEIVED\_TARGET\_POWER} + PL_c\},$$

where $P_{CMAX,c}(i)$ is a configured wireless device transmit power for subframe i of serving cell c, and $PL_c$ is a downlink path loss estimation calculated by the wireless device for serving cell c. Similarly, preamble transmission for a BFR procedure (e.g., a BFR-PRACH) may be determined as follows:

$$P_{BFR\text{-}PRACH} = \min\{P_{CMAX}, \text{initial received target power} + PL_c\}, \text{ where } P_{CMAX} \text{ is a configured wireless device transmit power.}$$

A wireless device may determine a path loss based on a high layer filtered RSRP. The wireless device may determine the high layer filtered RSRP based on one or more measurements of CRS and a filtering configuration by higher layers. As an example, the wireless device 2102 may determine $PL_c$ as follows:

$PL_c$=referenceSignalPower−higher layer filtered RSRP, where referenceSignalPower may be provided by higher layers, and where RSRP may comprise the linear average over the power contributions of the resource elements that carry cell-specific reference signals (CRS) within a considered measurement frequency bandwidth. The considered measurement frequency bandwidth may be for the reference serving cell, and the higher layer filter configuration may determine high layer filtered RSRP for the reference serving cell. If a wireless device transmits a PRACH preamble, the wireless device may determine the PRACH preamble transmit power based on the initial target power and a power offset. The power offset may be a value (e.g., configured, or predefined) related to at least one of: a PRACH format, or a PRACH numerology.

The wireless device may determine PREAMBLE_RECEIVED_TARGET_POWER using, e.g., preambleInitialReceivedTargetPower and DELTA_PREAMBLE, for an initial preamble transmission, as follows:

PREAMBLE_RECEIVED_TARGET_POWER=preambleInitialReceivedTargetPower+DELTA_PREAMBLE The value preambleInitialReceivedTargetPower, may be provided by a high layer signaling (e.g., RRC), and may be represented as follows:

| preambleInitialReceivedTargetPower | ENUMERATED { dBm-120, dBm-118, dBm-116, dBm-114, dBm-112, dBm-110, dBm-108, dBm-106, dBm-104, dBm-102, dBm-100, dBm-98, dBm-96, dBm-94, dBm-92, dBm-90} |
|---|---|

DELTA_PREAMBLE may comprise a parameter related to a preamble format, such as shown in Table 1. DELTA_PREAMBLE may be predefined. A preamble format may be configured by a RRC signaling.

TABLE 1

DELTA_PREAMBLE values.

| Preamble Format | DELTA_PREAMBLE value |
|---|---|
| 0 | 0 dB |
| 1 | 0 dB |
| 2 | −3 dB |
| 3 | −3 dB |
| 4 | 8 dB |

A wireless device may determine a path loss based on a layer 1 RSRP value. The wireless device may determine the layer 1 RSRP value based on one or more measurements of CSI-RSs. As an example, the wireless device 2102 may determine $PL_c$ as follows:

$PL_c$=referenceSignalPower−layer 1 RSRP, where referenceSignalPower may be provided by higher layers, and where layer 1 RSRP may comprise the linear average over the power contributions of the resource elements that carry CSI-RS within a considered measurement frequency bandwidth. The considered measurement frequency bandwidth may be for the reference serving cell. If a wireless device transmits a PRACH preamble, the wireless device may determine the PRACH preamble transmit power based on the initial target power and a power offset. The power offset may be a value (e.g., configured, or predefined) related to at least one of: a PRACH format, or a PRACH numerology.

The wireless device 2102 may determine a transmission power for a random access preamble (e.g., a PRACH) as described above, during step 2112. At step 2107, the wireless device 2102 may determine a transmission power for a BFR preamble based on a target received of a BFR-PRACH. The target received power of a BFR-PRACH transmission may be based on at least one of: the initial received target power of the RA preamble (e.g., PRACH), the power offset of the RA preamble, and/or the additional power offset of the BFR preamble (e.g., BFR-PRACH).

Additionally or alternatively, at step 2107, the wireless device 2102 may determine an additional power offset of a BFR-PRACH transmission based on one or more of: transmission power difference of RSs, received power difference of RSs, or power control commands. The wireless device 2102 may determine a transmitted or received power difference at least between a first CSI-RS resource and a second CSI-RS resource, between CSI-RSs and SS blocks, between SS blocks and DM-RSs of PBCH, or between CSI-RSs and DM-RSs of PBCH. For example, if the wireless device 2102 is configured with an RSRP measurement based on a CSI-RS, the wireless device 2102 may determine a power offset based on power difference between the CSI-RS and SS blocks.

Additionally or alternatively, the wireless device 2102 may determine a Layer 1 RSRP based on RS resources. The RS resources may be at least one of: CSI-RS resources, SS blocks, and/or DM-RSs of PBCH.

At step 2108, the wireless device 2102 may transmit a BFR preamble using the BFR preamble transmission power determined from step 2107. The BFR transmission power may be determined so as to increase the likelihood that the base station 2101 receives the BFR preamble at step 2109.

At step 2109, the base station 2101 may receive the BFR preamble and proceed with a BFR procedure. At step 2110, the base station 2101 may determine to initiate a random access procedure. At step 2111, the base station 2101 may transmit, and the wireless device 2102 may receive, a PDCCH order to initiate the random access procedure. For example, the base station 2101 may transmit a downlink control information in response the BFR preamble. The base station 2101 may successfully finish the BFR procedure.

At step 2112, the wireless device 2102 may determine a transmission power for the random access procedure. The wireless device may determine the transmission power as described above for an RA preamble (e.g., PRACH). For example, the preamble transmission power for an RA procedure (e.g., a PRACH) may be determined as follows:

$P_{PRACH}$=min{$(P_{CMAX,c}(i)$,PREAMBLE_RECEIVED_TARGET_POWER+$PL_c$}, where $P_{CMAX,c}(i)$ is a configured wireless device transmit power for subframe i of serving cell c, and $PL_c$ is a downlink path loss estimation calculated by the wireless device for serving cell c. The wireless device 2102 may determine a path loss based on a high layer filtered RSRP. The wireless device may determine the high layer filtered RSRP based on one or more measurements of CRS and a filtering configuration by higher layers. As an example, the wireless device 2102 may determine $PL_c$ as follows:

$PL_c$=referenceSignalPower−higher layer filtered RSRP, where referenceSignalPower may be provided by higher layers, and where RSRP may comprise the linear average over the power contributions of the resource elements that carry cell-specific reference signals (CRS) within a considered measurement frequency bandwidth. The considered measurement frequency bandwidth may be for the reference serving cell, and the higher layer filter configuration may determine high layer filtered RSRP for the reference serving cell. If a wireless device transmits a PRACH preamble, the wireless device may determine the PRACH preamble transmit power based on the initial target power and a power offset. The power offset may be a value (e.g., configured, or predefined) related to at least one of: a PRACH format, or a PRACH numerology.

The wireless device may determine PREAMBLE_RE-CEIVED_TARGET_POWER using, e.g., preambleInitial-ReceivedTargetPower and DELTA_PREAMBLE, for an initial preamble transmission, as follows:

PREAMBLE_RECEIVED_TARGET_POWER=preambleInitial-ReceivedTargetPower+DELTA_PREAMBLE The value preambleInitialReceivedTargetPower, may be provided by a high layer signaling (e.g., RRC), and may be represented as follows:

| preambleInitialReceivedTargetPower | ENUMERATED { dBm-120, dBm-118, dBm-116, dBm-114, dBm-112, dBm-110, dBm-108, dBm-106,dBm-104, dBm-102, dBm-100, dBm-98, dBm-96, dBm-94, dBm-92, dBm-90} |
|---|---|

DELTA_PREAMBLE may comprise a parameter related to a preamble format, such as shown in Table 1 above. DELTA_PREAMBLE may be predefined. A preamble format may be configured by a RRC signaling.

Additionally or alternatively, the wireless device 2102 may determine a Layer 1 RSRP based on RS resources. The RS resources may be at least one of: CSI-RS resources, SS blocks, and/or DM-RSs of PBCH.

At step 2113, the wireless device 2102 may transmit a random access preamble procedure (e.g., PRACH) for achieving uplink synchronization. The wireless device 2102 may transmit the random access preamble, e.g., via an uplink signal or channel, using the random access preamble transmission power determined in step 2112. The uplink signal or channel may comprise, e.g., a PRACH, a scheduling request, or a PUCCH transmission. In an RRC-CONNECTED state, the wireless device 2102 may maintain downlink and uplink synchronization with the base station 2101. The wireless device 2102 transmit an initial PRACH preamble using an initial preamble transmission power. The wireless device 2102 may employ an open loop control with full compensation for the path loss for the preamble transmission.

At step 2114, the base station 2101 may proceed with a random access procedure, e.g., after or in response to receiving the random access preamble. The base station 2101 and the wireless device 2102 may perform the random access procedure described above regarding steps 1605 to 1609 in FIG. 16.

Any base station or wireless device may perform any combination of one or more of the above steps of FIG. 21. A core network device, or any other device, may perform any combination of a step, or a complementary step, of one or more of the above steps. Some or all of these steps may be performed, and the order of these steps may be adjusted. For example, one or more of steps 2105-2109 or one or more of steps 2110-2114 may not be performed. As other examples, steps 2110-2114 may be performed before, in parallel, or after steps 2105-2109; and/or step 2105 may be performed before step 2111 and step 2114 may be performed before step 2109 (e.g., the time duration of steps 2105-2109 may exceed the time duration of steps 2110-2114). Additional steps may also be performed.

Figure 23:
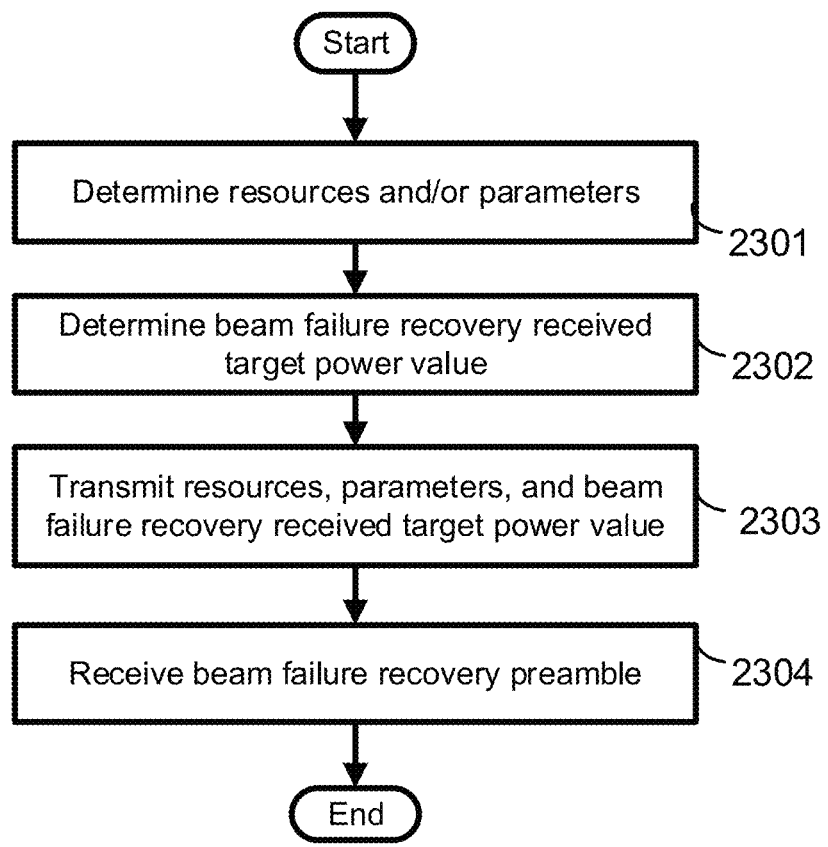
FIG. 23 shows an example of a beam failure recovery procedure by a base station.

FIG. 23 shows an example of a beam failure recovery procedure that may be performed by a base station. This beam failure recovery procedure may be used to determine a BFR transmission power based on a received target power value for a BFR transmission. At step 2301, a base station may determine resources and/or parameters for a BFR preamble (e.g., BFR-PRACH). The resources may comprise reference signals, and the parameters may comprise received target power values. For example, the resources and/or parameters may comprise one or more of the following: CSI-RS resources, QCL parameters between CSI-RS and DM-RS of a control channel, transmission power of CSI-RS resources, BFR-PRACH resources, or initial received target power of BFR-PRACH.

At step 2302, the base station may determine a BFR received target power value, e.g., an indication of an initial target received power of the BFR preamble transmission. The BFR received target power value may be based on one or more of: a preamble format, a measured uplink interference and noise level in the time/frequency resource allocated to BFR-PRACH preambles, power control commands, a desired received signal to interference plus noise ratio (SINR), transmit power difference between SS blocks and CSI-RSs, or transmit power difference between SS blocks and DM-RSs of PBCH.

At step 2303, the base station may transmit resources, parameters, and/or the BFR received target value. For example, the base station may transmit one or more messages comprising configuration parameters that may comprise one or more of: CSI-RS resources, QCL parameters between CSI-RS and DM-RS of a control channel, transmission power of CSI-RS resources, BFR-PRACH resources, or initial received target power of a BFR-PRACH. The base station may transmit the one or more messages, e.g., via RRC signaling, via MAC signaling, via an L1 downlink control channel, via device-specific (e.g., wireless device-specific) signaling (e.g., RRC), or via cell-specific signaling (e.g., RRC).

At step 2304, the base station may receive a BFR preamble. The BFR preamble may be received via resources identified in a transmission from step 2303. The BFR preamble may be transmitted using a transmission power based on the initial received target power of a BFR-PRACH from step 2303. By receiving the BFR preamble, the base station may determine that a beam failure has occurred. After or in response to receiving the BFR preamble, the base station may proceed with a BFR procedure.

Any base station may perform any combination of one or more of the above steps of FIG. 23. A wireless device, core network device, or any other device, may perform any combination of a step, or a complementary step, of one or more of the above steps. Some or all of these steps may be performed, and the order of these steps may be adjusted. For example, one or more of step 2302 or step 2304 may not be performed. As another example, step 2302 may be performed before step 2301, or step 2303 may be performed before step 2302. Additional steps may also be performed.

Figure 24:
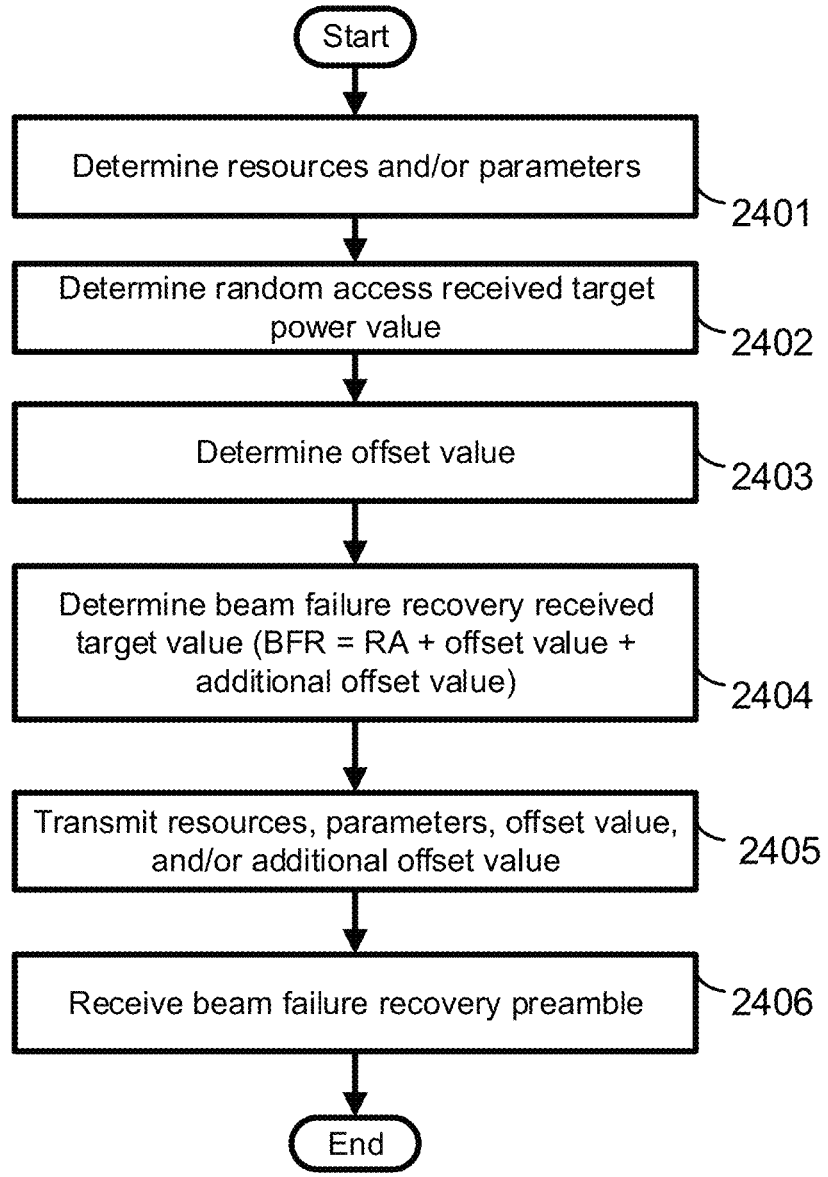
FIG. 24 shows an example of a beam failure recovery preamble procedure by a base station using offsets.

FIG. 24 shows an example of a beam failure recovery preamble procedure using offsets (e.g., power offsets) that may be performed by a base station. The power offsets may be determined by a base station and used by a wireless device to determine an amount of power for a BFR transmission above a power for an RA transmission (e.g., a non-BFR PRACH transmission). At step 2401, a base station may determine resources and/or parameters for a random access (RA) procedure and/or for a BFR procedure. The resources may comprise reference signals.

At step 2402, the base station may determine a received target power value for a random access procedure, e.g., an initial received target power of a PRACH preamble. The random access received target power value may be used by a wireless device if, e.g., the wireless device transmits an RA preamble (e.g., PRACH preamble). The first RA preamble may be for uplink synchronization. At step 2403, the base station may determine an offset. The offset may comprise an offset value to be added to the random access received target power value for determining a transmission power of an RA preamble. The offset may be a value (e.g., configured, or predefined) related to at least one of: a PRACH format, or a PRACH numerology.

At step 2404, the base station may determine a BFR received target value. The BFR received target value may be determined by, e.g., adding the offset value to the random access received target power value, and adding an additional offset value. The additional offset value may correspond to a power value for a BFR preamble transmission power that is above an RA preamble transmission power value. By determining a BFR received target value comprising an additional offset, the base station can increase the likelihood that a BFR preamble is transmitted by a wireless device with sufficient transmission power to be received by the base station. The base station may determine a value of the additional offset based on one or more of at least: a preamble format, a preamble numerology, a measured uplink interference and noise level in the time/frequency resource allocated to BFR-PRACH or RA (e.g., PRACH) preambles, power control commands, a desired received signal to interference plus noise ratio (SINR) for detecting a BFR-PRACH preamble, a transmit power difference between SS blocks and CSI-RSs, or a transmit power difference between SS blocks and DM-RSs of a PBCH.

At step 2405, the base station may transmit, e.g., to a wireless device, the resources, parameters, offset value, and/or additional offset value. For example, the base station may transmit one or more messages comprising configuration parameters of a BFR-PRACH. The configuration parameters of the BFR-PRACH may comprise an additional offset. The additional offset may indicate a power offset for a BFR-PRACH transmission power above a random access preamble (e.g., PRACH) transmission power. The base station may transmit the one or more messages, e.g., via device-specific (e.g., wireless device-specific) RRC signaling, or via cell-specific RRC signaling. A wireless device may determine a target received power of a BFR-PRACH transmission by at least one of: the initial received target power of an RA preamble (e.g., PRACH), the power offset of the RA preamble, and/or the additional power offset of the BFR-PRACH. As shown in FIG. 22, described above, a base station may transmit a configuration of an additional BFR-PRACH power offset 2204 after the base station transmits a RACH configuration 2203.

The base station may transmit, e.g., at step 2405, one or more messages comprising configuration parameters that may comprise one or more of: CSI-RS resources, QCL parameters between CSI-RS and DM-RS of a control channel, transmission power of CSI-RS resources, BFR-PRACH resources or an additional BFR-PRACH power offset. The base station may transmit the one or more messages via RRC signaling, via MAC signaling, and/or via an L1 downlink control channel.

Any base station may perform any combination of one or more of the above steps of FIG. 24. A wireless device, core network device, or any other device, may perform any combination of a step, or a complementary step, of one or more of the above steps. Some or all of these steps may be performed, and the order of these steps may be adjusted. For example, one or more of step 2402 or step 2406 may not be performed. As another example, one or more of steps 2401-2404 may be performed in parallel. Additional steps may also be performed.

Figure 25:
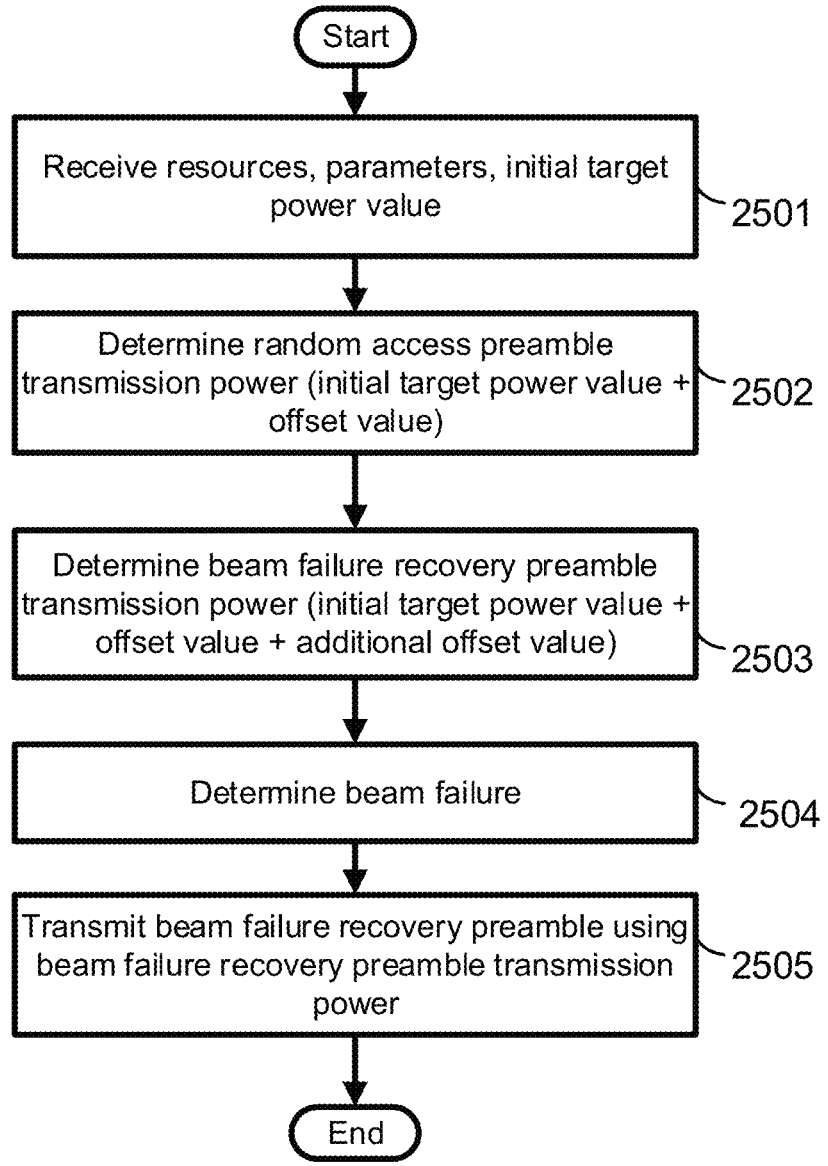
FIG. 25 shows an example of a beam failure recovery preamble procedure by a wireless device using offsets.

FIG. 25 shows an example of a beam failure recovery preamble procedure using offsets (e.g., power offsets) that may be performed by a wireless device. The power offsets may be determined by a wireless device, and the wireless device may use the power offsets to determine an amount of power for a BFR transmission above a power for an RA transmission (e.g., a non-BFR PRACH transmission). At step 2501, a wireless device may receive, from a base station, resources, parameters, and/or an initial target power value. For example, the wireless device may receive one or more messages comprising configuration parameters of a RA (e.g., RACH) procedure via RRC signaling. The configuration parameters of the RA procedure may comprise an initial received target power of an RA preamble. The resources may comprise, and/or the parameters may indicate, RS resources for one or more RSRP measurements. The RS resources may comprise at least one of: CSI-RSs, SS blocks and/or DM-RSs of a PBCH. The parameters may comprise a first type of RSs for channel quality measurement of initial access, and a second type of RSs for channel quality measurement of a BFR request. The wireless device may employ initial access based on channel quality measurement on SS blocks, and/or the wireless device may employ a BFR request transmission based on channel quality measurement on CSI-RSs.

At step 2502, the wireless device may determine a random access preamble transmission power. For example, if a wireless device is to transmit an RA preamble (e.g., a PRACH preamble), the wireless device may determine the RA preamble transmission power based on the initial target power and a power offset. For example, the wireless device may determine an offset value (e.g., power offset) and the wireless device may determine the RA preamble transmission power by adding the offset value to the initial target power value. The offset value may be a configured or predefined value related to at least one of: a PRACH format, or a PRACH numerology.

At step 2503, the wireless device may determine a beam failure recovery preamble transmission power. The BFR preamble transmission power may be based on an additional offset value (e.g., additional power offset). For example, the wireless device may determine the BFR preamble transmission power by adding the RA preamble transmission power (e.g., a sum of the initial target power and an offset value) with an additional offset. The additional offset value for a BFR preamble (e.g., BFR-PRACH) transmission may be based on one or more of: transmission power difference of RSs, received power difference of RSs, or power control commands. For example, the wireless device may determine a transmitted or received power difference at least between a first CSI-RS resource and a second CSI-RS resource, or between CSI-RSs and SS blocks, or between SS blocks and DM-RSs of a PBCH, or between CSI-RSs and DM-RSs of a PBCH. For example, if a wireless device is configured with an RSRP measurement based on a CSI-RS, the wireless device may determine the additional power offset based on power difference between the CSI-RS and SS blocks. The wireless device may determine a target received power of a BFR preamble (e.g., BFR-PRACH) transmission by at least one of: the initial received target power of the RA preamble (e.g., PRACH), the power offset of the RA preamble, and/or the additional power offset of the BFR preamble (e.g., BFR-PRACH).

At step 2504, the wireless device may determine a beam failure. The wireless device may determine the beam failure as described above regarding step 2106 shown in FIG. 21. At step 2505, the wireless device may transmit, to a base station, a BFR preamble using the beam failure recovery preamble transmission power determined at step 2503.

Any wireless device may perform any combination of one or more of the above steps of FIG. 25. A base station, core network device, or any other device, may perform any combination of a step, or a complementary step, of one or more of the above steps. Some or all of these steps may be performed, and the order of these steps may be adjusted. For example, step 2502 may not be performed. As another example, one or more of step 2502 or step 2503 may be performed after step 2504. As another example, step 2502 and step 2503 may be performed in parallel. Additional steps may also be performed.

Figure 26:
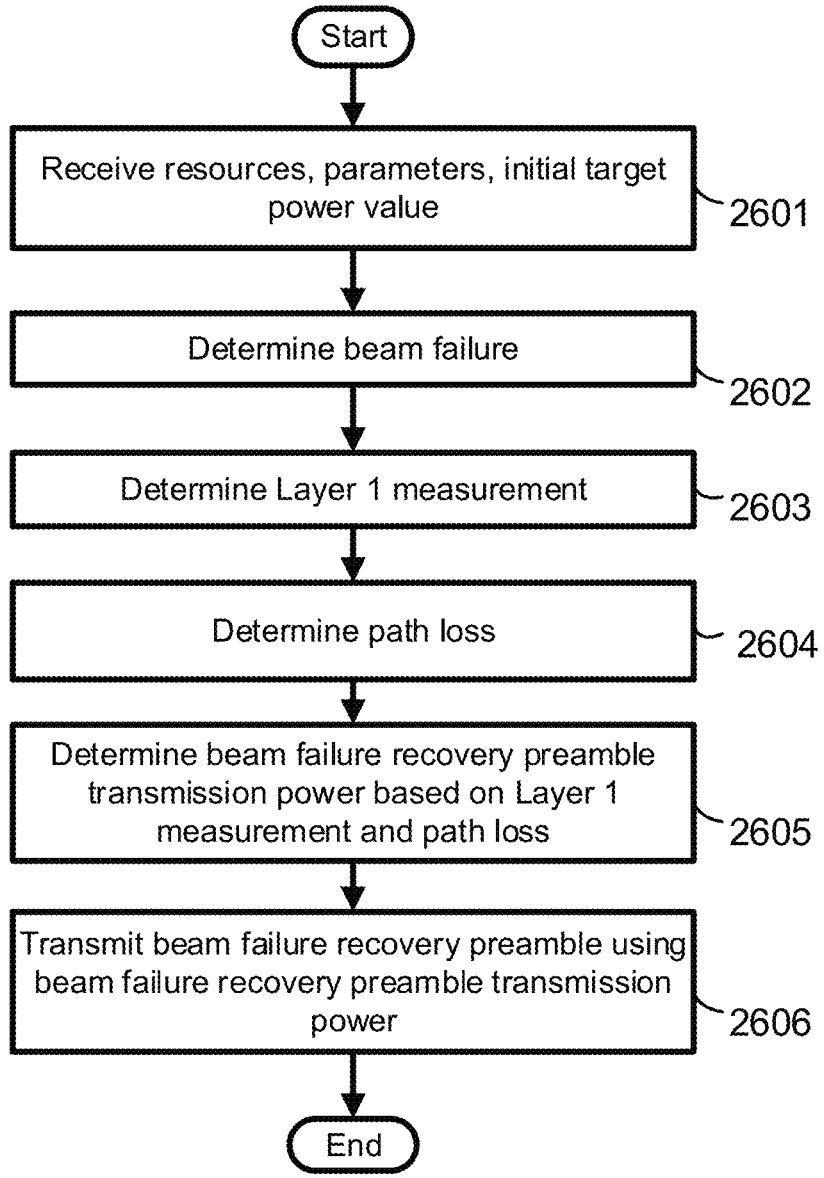
FIG. 26 shows an example of a beam failure recovery preamble procedure by a wireless device using Layer 1 measurement and path loss.

FIG. 26 shows an example of a beam failure recovery preamble procedure by a wireless device using Layer 1 measurement and path loss. In contrast to a high layer filtered RSRP, a Layer 1 RSRP based on RS resources may be performed more quickly with less processing. At step 2601, the wireless device may receive resources, parameters, and/or an initial target power value. Step 2601 may correspond to the same step as step 2501 described above. For example, the wireless device may receive one or more messages comprising configuration parameters that may comprise one or more of: SS blocks, transmission power of SS blocks, CSI-RS resources, transmission power of CSI-RS resources, DM-RSs resources of a PBCH, or transmission power of DM-RSs of a PBCH.

At step 2602, the wireless device may determine a beam failure. Step 2602 may correspond to the same step as step 2504 described above.

The wireless device may determine a BFR preamble (e.g., BFR request) transmission power by steps 2603-2605. At step 2603, the wireless device may determine a Layer 1 RSRP based on RS resources received at step 2601. The RS resources may comprise one or more of: CSI-RS resources, SS blocks, or DM-RSs of a PBCH. The wireless device may be configured (e.g., by a base station) with a layer 1 RSRP measurement employed on CSI-RS resources, or SS blocks, or DM-RSs of a PBCH, or any combination thereof. The wireless device may determine a Layer 1 RSRP measurement, e.g., by averaging multiple measurements on multiple beams. Additionally or alternatively, the wireless device may determine a Layer 1 RSRP measurement by selecting from multiple measurements on multiple beams, e.g., based on a selection criterion. For example, a selection criterion may be that a specific beam indicated by a base station to the wireless device is selected, that an RSRP measurement with the best beam link quality of a beam (e.g., the beam having the highest RSRP value among multiple beams) is selected, and/or that an RSRP measurement with the worst beam link quality of a beam (e.g., the beam having the lowest RSRP value among multiple beams) is selected. The wireless device may determine a Layer 1 CSI-RS RSRP value for a beam, and/or determine a Layer 1 CSI-RS RSRP value for a beam set, e.g., if the wireless device is configured with multiple CSI-RS resource sets, and/or with a CSI-RS resource set with multiple CSI-RS resources. A Layer 1 CSI-RS RSRP value may comprise a linear average over the power contributions of the resource elements that carry CSI-RSs, associated with a beam, within the considered measurement frequency location, for a reference serving cell.

At step 2604, the wireless device may determine a path loss. The wireless device may determine a path loss, e.g., by using a reference signal power value obtained and a Layer 1 RSRP measured, as follows:

$$PL_c = \text{ReferenceSignalPower} - \text{RSRP}$$

At step 2605, the wireless device may determine a BFR preamble transmission power based on Layer 1 measurement and/or path loss. For example, the wireless device may transmit a BFR request via a BFR-PRACH with a transmit power determined by a path loss. Additionally or alternatively, the wireless device may determine a path loss based on a Layer 1 RSRP measurement of RS resources associated with one or multiple serving beams, or one or more candidate beams. The wireless device may determine the BFR preamble (e.g., BFR-PRACH) transmission power as follows:

$$P_{BFR\text{-}PRACH} = \min\{P_{CMAX}, \text{initial received target power} + PL_c\},$$

where $P_{CMAX}$ is a configured wireless device transmit power.

At step 2606, the wireless device may transmit a BFR preamble using the BFR preamble transmission power determined at step 2606. The wireless device may transmit the BFR preamble as described above regarding step 2112 shown in FIG. 21.

Any wireless device may perform any combination of one or more of the above steps of FIG. 26. A base station, core network device, or any other device, may perform any combination of a step, or a complementary step, of one or more of the above steps. Some or all of these steps may be performed, and the order of these steps may be adjusted. For example, one or more of steps 2603-2605 may be performed before step 2602. As another example, one or more of step 2603, step 2604, or step 2605 may be performed in parallel. Additional steps may also be performed.

Figure 27:
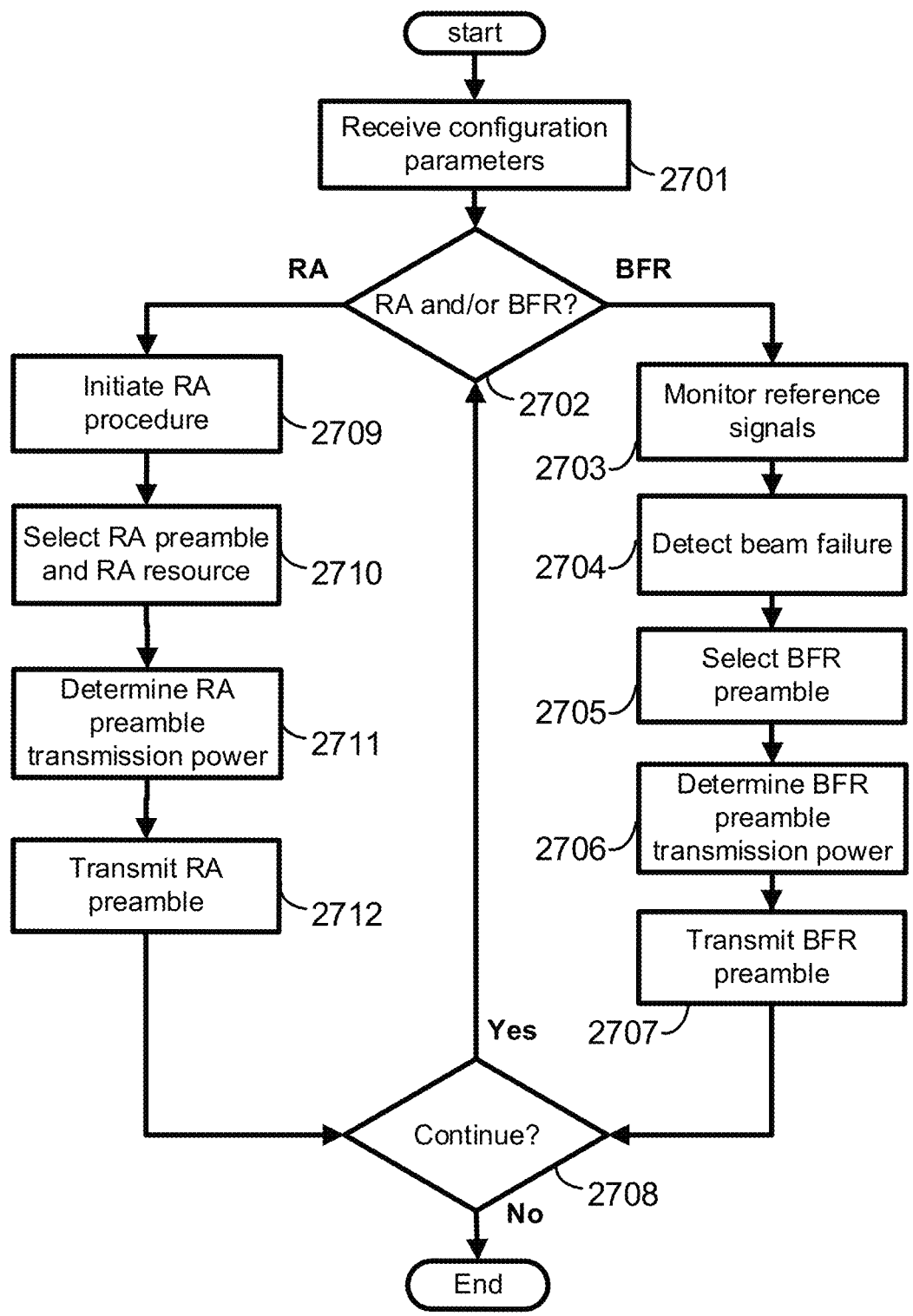
FIG. 27 shows an example of procedures for random access preamble transmission and beam failure recovery preamble transmission by a wireless device.

FIG. 27 shows an example of procedures for random access preamble transmission and beam failure recovery preamble transmission by a wireless device. At step 2701, the wireless device may receive configuration parameters. Step 2701 may correspond to the same step as step 2104 (FIG. 21), step 2501 (FIG. 25), or step 2601 (FIG. 26) described above. At step 2702, the wireless device may determine whether to perform an RA procedure and/or a BFR procedure. For example, if the configuration parameters comprise PRACH resource and BFR-PRACH resources, the wireless device may determine to perform both an RA procedure and a BFR procedure. If the configuration parameters do not comprise BFR-PRACH resources, the wireless device may determine to perform an RA procedure but not a BFR procedure. If the configuration parameters comprise BFR-PRACH resources but not RA resources, the wireless device may determine to perform a BFR procedure but not an RA procedure. As another example, a wireless device may monitor an RS (e.g., at step 2703) and, at the same, overlapping, or similar time, the wireless device may receive a PDCCH order (e.g., to initiate an RA procedure at step 2709).

If the wireless device determines to perform a BFR procedure, the wireless device may monitor reference signals at step 2703. Step 2703 may correspond to the same step as step 2105 (FIG. 21) described above. For example, the wireless device may monitor RSs for beam failure detection and recovery based on a first threshold and/or a second threshold. The wireless device may detect a beam failure at step 2704, which may correspond to the same step as step 2106 (FIG. 21) described above. For example, detecting a beam failure may be based on a channel quality of one or more first RSs (e.g., for a serving beam) being below the first threshold and/or one or more second RSs (e.g., for a candidate beam) being above the second threshold (e.g., to identify a potential candidate beam). At step 2705, the wireless device may select a BFR preamble, e.g., after or in response to detecting the beam failure. The BFR preamble may be selected based on its association with BFR resources corresponding to RSs identified in step 2703. At step 2706, the wireless device may determine a BFR preamble transmission power, which may correspond to the same step as step 2107 (FIG. 21), step 2503 (FIG. 25), or step 2605 (FIG. 26) described above. At step 2707, the wireless device may transmit the BFR preamble, which may correspond to the same step as step 2108 (FIG. 21), step 2505 (FIG. 25), or step 2606 (FIG. 26) described above. At step 2708, the wireless device may determine whether to continue or end the procedures. If the wireless device determines to continue the procedures, e.g., to proceed with an RA procedure or an additional BFR procedure, the wireless device may return to step 2702.

If the wireless device determines to perform an RA procedure, at step 2702, the wireless device may proceed to initiate an RA procedure at step 2709. The wireless device may receive a PDCCH order and the wireless device may initiate the RA procedure after or in response to receiving the PDCCH order. The wireless device may initiate the RA procedure, without receiving a PDCCH order, e.g., for uplink synchronization. At step 2710, the wireless device may select an RA preamble and/or an RA resource. The wireless device may have received the RA preamble and/or the RA resource at step 2701. Step 2710 may correspond to the same step as step 2107 (FIG. 21) described above. At step 2711, the wireless device may determine the RA preamble transmission power, which may correspond to the same step as step 2112 (FIG. 21) or step 2502 (FIG. 25) described above. At step 2712, the wireless device may transmit the RA preamble, which may correspond to the same step as step 1605 (FIG. 16) or step 2113 (FIG. 21) described above. At step 2708, the wireless device may determine whether to continue or end the procedures. If the wireless device determines to continue the procedures, e.g., to proceed with an additional RA procedure or a BFR procedure, the wireless device may return to step 2702.

Any wireless device may perform any combination of one or more of the above steps of FIG. 27. A base station, a core network device, or any other device, may perform any combination of a step, or a complementary step, of one or more of the above steps. Some or all of these steps may be performed, and the order of these steps may be adjusted. For example, one or more of steps 2709-2712 or one or more of steps 2703-2707 may not be performed. As other examples, steps 2709-2712 may be performed before, in parallel, or after steps 2703-2707; and/or step 2703 may be performed before step 2709 and step 2712 may be performed before step 2707 (e.g., the time duration of steps 2703-2707 may exceed the time duration of steps 2709-2712). Additional steps may also be performed.

Figure 28:
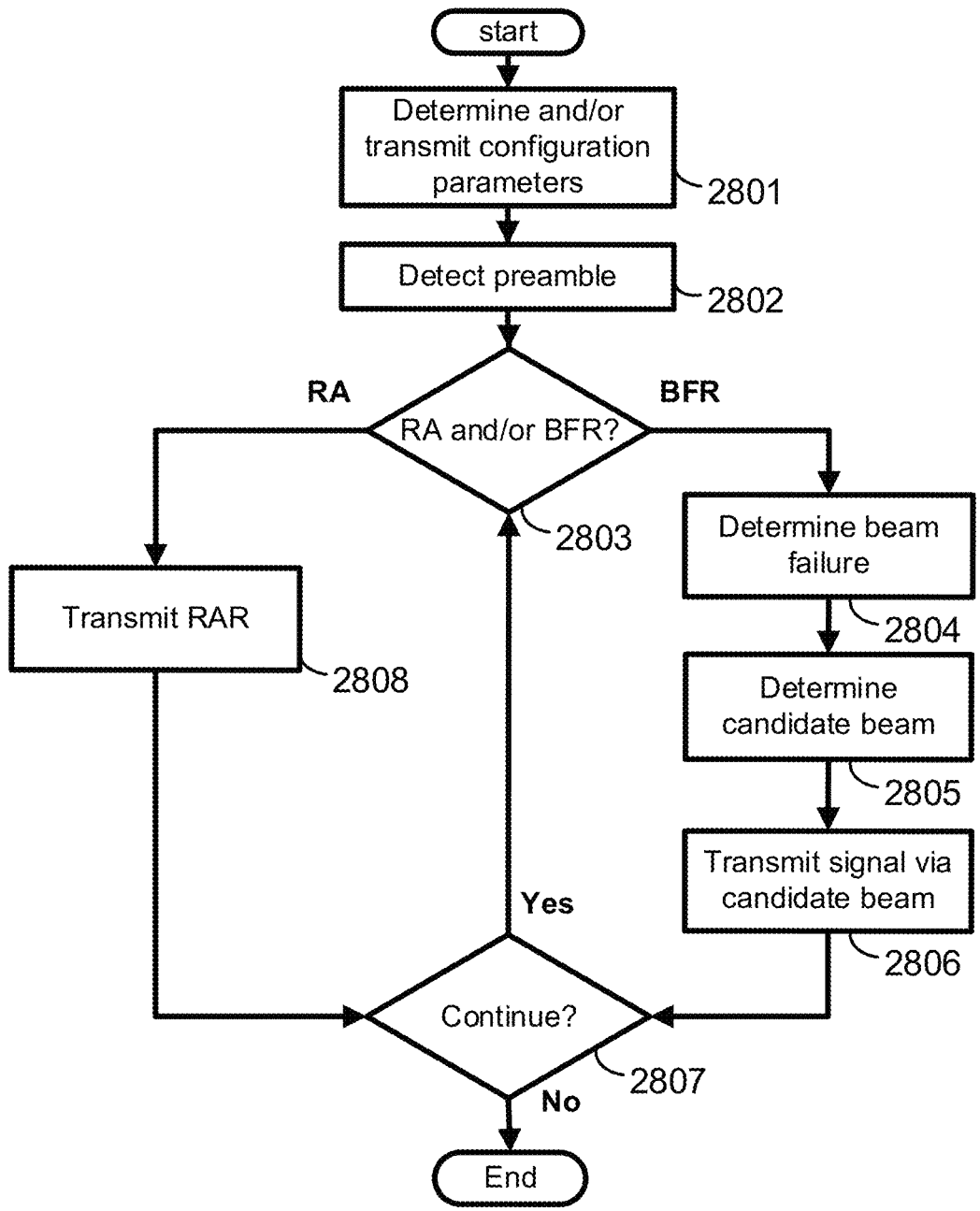
FIG. 28 shows an example of random access and beam failure recovery procedures by a base station.

FIG. 28 shows an example of random access and beam failure recovery procedures by a base station. At step 2801, the base station may determine and/or transmit configuration parameters. Step 2801 may correspond to the same step as step 2103 (FIG. 21), step 2301 (FIG. 23), or step 2401 (FIG. 24) described above. At step 2802, the base station may detect one or more preambles, which may correspond to the same step as step 2109 or step 2114 (FIG. 21). For example, the base station may monitor PRACH resources determined in step 2801. Each PRACH resource may be associated with a preamble. By determining a PRACH resource includes a signal, the base station may determine that a preamble associated with that PRACH resource has been detected. At step 2803, the base station may determine whether to perform an RA procedure and/or a BFR procedure. For example, if the one or more preambles detected in step 2802 are associated with PRACH resource and BFR-PRACH resources, the base station may determine to perform both an RA procedure and a BFR procedure. If the one or more preambles detected in step 2802 are not associated with BFR-PRACH resources, the base station may determine to perform an RA procedure but not a BFR procedure. If the one or more preambles are associated with BFR-PRACH resources but not RA resources, the base station may determine to perform a BFR procedure but not an RA procedure.

If the base station determines to perform a BFR procedure, the base station may determine a beam failure at step 2804, which may correspond to the same step as step 2109 (FIG. 21) described above. For example, determining a beam failure may comprise determining that a BFR-PRACH preamble received in step 2802 was associated with a candidate beam, and/or determining that a BFR-PRACH preamble was received using resources and/or parameters that are not associated with a serving beam via which the base station transmitted the configuration parameters in step 2801. At step 2805, the base station may determine a candidate beam. The candidate beam may be determined based on one or more measurements of RSs. For example, the base station may determine a candidate beam associated with a highest signal quality measurement. At step 2806, the base station may transmit a signal via a candidate beam determined at step 2805. For example, the base station may transmit a control signal (e.g., PDCCH DCI) using the candidate beam, and/or the base station may transmit a data packet using the candidate beam. At step 2807, the base station may determine whether to continue or end the procedures. If the base station determines to continue the procedures, e.g., to proceed with an RA procedure or an additional BFR procedure, the base station may return to step 2803.

If the base station determines to perform an RA procedure, at step 2803, the base station may proceed with an RA procedure by transmitting a random access response (RAR) at step 2808. Step 2808 may correspond to the same step as step 1606 (FIG. 16) described above. The base station may proceed with remaining steps for an RA procedure that may correspond to steps 1607-1609 (FIG. 16) described above. At step 2807, the base station may determine whether to continue or end the procedures. If the base station determines to continue the procedures, e.g., to proceed with an additional RA procedure or a BFR procedure, the wireless device may return to step 2803.

Any base station may perform any combination of one or more of the above steps of FIG. 28. A wireless device, a core network device, or any other device, may perform any combination of a step, or a complementary step, of one or more of the above steps. Some or all of these steps may be performed, and the order of these steps may be adjusted. For example, step 2808 or one or more of steps 2804-2806 may not be performed. As another example, step 2808 may be performed before, in parallel, or after steps 2804-2806. Additional steps may also be performed.

A base station may perform any combination of one or more of the above steps. A wireless device, or any other device, may perform any combination of a step, or a complementary step, of one or more of the above steps. Any base station described herein may be a current base station, a serving base station, a source base station, a target base station, or any other base station.

Figure 29:
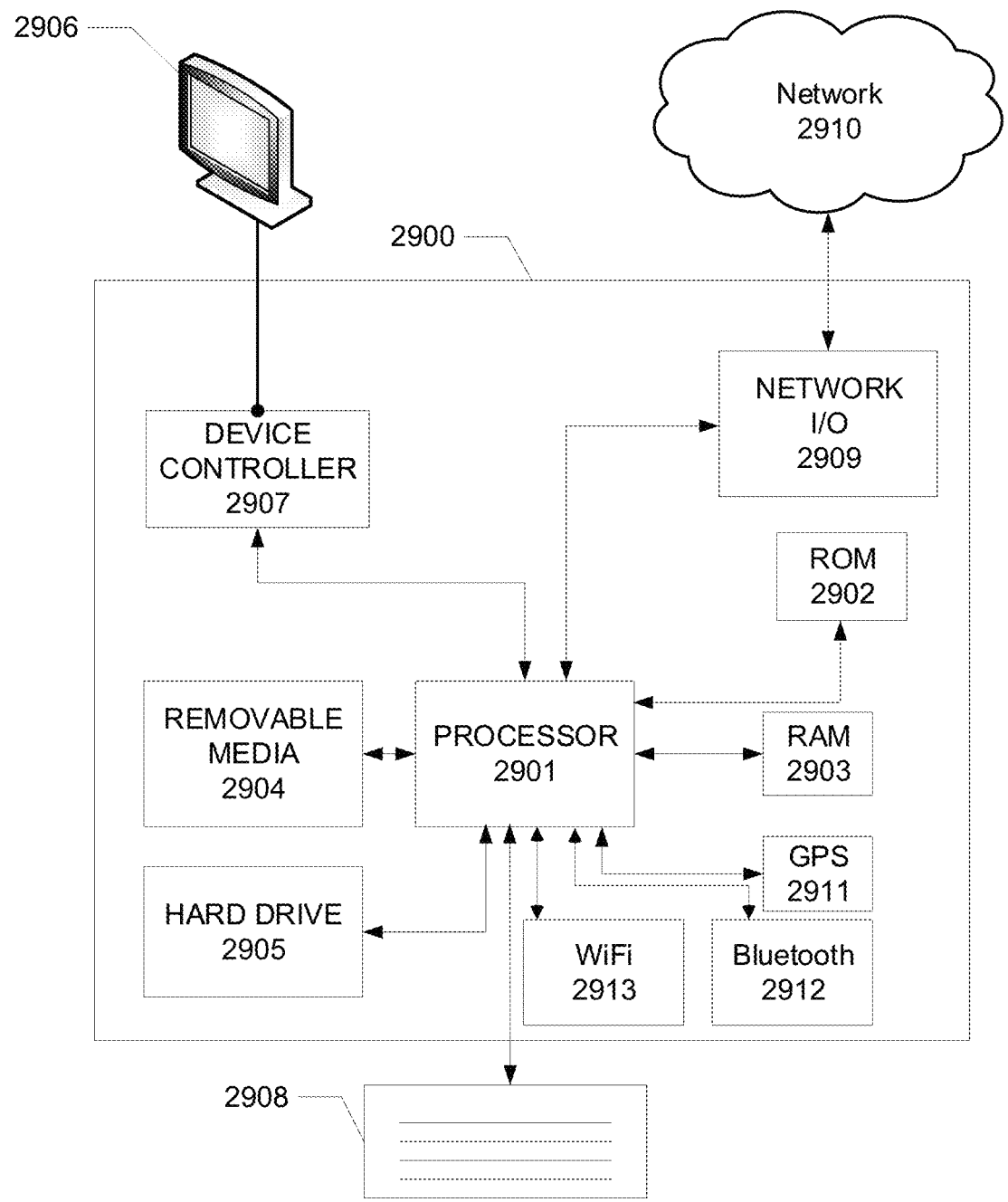
FIG. 29 shows example elements of a computing device that may be used to implement any of the various devices described herein.

FIG. 29 shows general hardware elements that may be used to implement any of the various computing devices discussed herein, including, e.g., the base station 401, the base station 1501, the base station 1621, the base station 1701, the base station 1901, the first base station 2001, the second base station 2006, the base station 2101, the wireless device 406, the wireless device 1620, the wireless device 1902, the wireless device 2002, the wireless device 2102, or any other base station, wireless device, or computing device. The computing device 2900 may include one or more processors 2901, which may execute instructions stored in the random access memory (RAM) 2903, the removable media 2904 (such as a Universal Serial Bus (USB) drive, compact disk (CD) or digital versatile disk (DVD), or floppy disk drive), or any other desired storage medium. Instructions may also be stored in an attached (or internal) hard drive 2905. The computing device 2900 may also include a security processor (not shown), which may execute instructions of one or more computer programs to monitor the processes executing on the processor 2901 and any process that requests access to any hardware and/or software components of the computing device 2900 (e.g., ROM 2902, RAM 2903, the removable media 2904, the hard drive 2905, the device controller 2907, a network interface 2909, a GPS 2911, a Bluetooth interface 2912, a WiFi interface 2913, etc.). The computing device 2900 may include one or more output devices, such as the display 2906 (e.g., a screen, a display device, a monitor, a television, etc.), and may include one or more output device controllers 2907, such as a video processor. There may also be one or more user input devices 2908, such as a remote control, keyboard, mouse, touch screen, microphone, etc. The computing device 2900 may also include one or more network interfaces, such as a network interface 2909, which may be a wired interface, a wireless interface, or a combination of the two. The network interface 2909 may provide an interface for the computing device 2900 to communicate with a network 2910 (e.g., a RAN, or any other network). The network interface 2909 may include a modem (e.g., a cable modem), and the external network 2910 may include communication links, an external network, an in-home network, a provider's wireless, coaxial, fiber, or hybrid fiber/coaxial distribution system (e.g., a DOCSIS network), or any other desired network. Additionally, the computing device 2900 may include a location-detecting device, such as a global positioning system (GPS) microprocessor 2911, which may be configured to receive and process global positioning signals and determine, with possible assistance from an external server and antenna, a geographic position of the computing device 2900.

The example in FIG. 29 is a hardware configuration, although the components shown may be implemented as software as well. Modifications may be made to add, remove, combine, divide, etc. components of the computing device 2900 as desired. Additionally, the components may be implemented using basic computing devices and components, and the same components (e.g., processor 2901, ROM storage 2902, display 2906, etc.) may be used to implement any of the other computing devices and components described herein. For example, the various components described herein may be implemented using computing devices having components such as a processor executing computer-executable instructions stored on a computer-readable medium, as shown in FIG. 29. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to provide the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a wireless device from a base station, one or more radio resource control messages comprising configuration parameters of a cell, wherein the configuration parameters comprise:
      a first preamble received target power value for beam failure recovery associated with the cell; and
      a second preamble received target power value for random access associated with the cell;
   based on a beam failure of the cell, transmitting, using a first transmission power that is based on the first preamble received target power value, a first preamble for beam failure recovery associated with the beam failure of the cell; and
   transmitting, via the cell and using a second transmission power that is based on the second preamble received target power value, a second preamble associated with random access.

2. The method of claim 1, further comprising:
   determining the first transmission power based on adding the first preamble received target power value and a power offset value indicated by a preamble format parameter.

3. The method of claim 1, further comprising:
   measuring, based on one or more first reference signal resources, a beam link quality; and
   determining, based on the measured beam link quality, the beam failure of the cell.

4. The method of claim 1, wherein the first transmission power is further based on a first reference signal power value and a first path loss value.

5. The method of claim 4, wherein the first path loss value is based on a layer 1 reference signal received power value.

6. The method of claim 1, wherein the configuration parameters further comprise at least one of:
   a channel state information reference signal;
   a synchronization signal block; or
   a demodulation reference signal for a physical broadcast channel.

7. The method of claim 1, wherein the transmitting the second preamble comprises:
   transmitting, based on receiving a physical downlink control channel order, the second preamble.

8. A method comprising:
   transmitting, by a base station to a wireless device, one or more radio resource control messages comprising configuration parameters of a cell, wherein the configuration parameters comprise:
      a first preamble received target power value for beam failure recovery associated with the cell; and
      a second preamble received target power value for random access associated with the cell;
   receiving, from the wireless device, a first preamble for beam failure recovery associated with a beam failure of the cell, wherein a first transmission power of the first preamble is based on the first preamble received target power value; and
   receiving, via the cell and from the wireless device, a second preamble associated with random access, wherein a second transmission power of the second preamble is based on the second preamble received target power value.

9. The method of claim 8, wherein the first transmission power comprises a sum of the first preamble received target power value and a power offset value indicated by a preamble format parameter.

10. The method of claim 8, further comprising:
    determining, based on the receiving the first preamble, the beam failure of the cell; and
    transmitting, after the determining the beam failure of the cell, a signal associated with beam failure recovery.

11. The method of claim 8, wherein the first transmission power is further based on a first reference signal power value and a first path loss value.

12. The method of claim 11, wherein the first path loss value is based on a layer 1 reference signal received power value.

13. The method of claim 8, wherein the configuration parameters further comprise at least one of:
    a channel state information reference signal;
    a synchronization signal block; or
    a demodulation reference signal for a physical broadcast channel.

14. The method of claim 8, further comprising:
    transmitting, before receiving the second preamble, a physical downlink control channel order to cause the wireless device to transmit the second preamble.

15. A method comprising:
    receiving, by a wireless device from a base station, one or more radio resource control messages comprising configuration parameters, wherein the configuration parameters comprise:
       a first target power value for beam failure recovery; and
       a second target power value for random access;
    detecting a failure of a first beam;
    transmitting, based on the detecting and using a first transmission power that is based on the first target power value, a first preamble for beam failure recovery;

receiving a physical downlink control channel (PDCCH) order; and transmitting, based on the PDCCH order and using a second transmission power that is based on the second target power value, a second preamble for random access.

16. The method of claim 15, further comprising:
determining the first transmission power, wherein the determining the first transmission power comprises adding the first target power value and a power offset value indicated by a preamble format parameter.

17. The method of claim 15, wherein the first transmission power is further based on a first reference signal power value and a first path loss value.

18. The method of claim 17, wherein the first path loss value is based on a layer 1 reference signal received power value.

19. The method of claim 15, wherein the configuration parameters further comprise at least one of:
a channel state information reference signal;
a synchronization signal block; or
a demodulation reference signal for a physical broadcast channel.

20. The method of claim 15, further comprising:
based on the receiving the PDCCH order, selecting the second preamble.

21. A wireless device comprising:
one or more processors; and
memory storing instructions that, when executed by the one or more processors, cause the wireless device to:
receive, from a base station, one or more radio resource control messages comprising configuration parameters of a cell, wherein the configuration parameters comprise:
a first preamble received target power value for beam failure recovery associated with the cell; and
a second preamble received target power value for random access associated with the cell;
based on a beam failure of the cell, transmit, using a first transmission power that is based on the first preamble received target power value, a first preamble for beam failure recovery associated with the beam failure of the cell; and
transmit, via the cell and using a second transmission power that is based on the second preamble received target power value, a second preamble associated with random access.

22. The wireless device of claim 21, wherein the instructions, when executed by the one or more processors, cause the wireless device to:
determine the first transmission power based on adding the first preamble received target power value and a power offset value indicated by a preamble format parameter.

23. The wireless device of claim 21, wherein the instructions, when executed by the one or more processors, cause the wireless device to:
measure, based on one or more first reference signal resources, a beam link quality; and
determine, based on the measured beam link quality, the beam failure of the cell.

24. The wireless device of claim 21, wherein the first transmission power is further based on a first reference signal power value and a first path loss value.

25. The wireless device of claim 24, wherein the first path loss value is based on a layer 1 reference signal received power value.

26. The wireless device of claim 21, wherein the configuration parameters further comprise at least one of:
a channel state information reference signal;
a synchronization signal block; or
a demodulation reference signal for a physical broadcast channel.

27. The wireless device of claim 21, wherein the instructions, when executed by the one or more processors, cause the wireless device to transmit the second preamble by:
transmitting, based on receiving a physical downlink control channel order, the second preamble.

28. A base station comprising:
one or more processors; and
memory storing instructions that, when executed by the one or more processors, cause the base station to:
transmit, to a wireless device, one or more radio resource control messages comprising configuration parameters of a cell, wherein the configuration parameters comprise:
a first preamble received target power value for beam failure recovery associated with the cell; and
a second preamble received target power value for random access associated with the cell;
receive, from the wireless device, a first preamble for beam failure recovery associated with a beam failure of the cell, wherein a first transmission power of the first preamble is based on the first preamble received target power value; and
receive, via the cell and from the wireless device, a second preamble associated with random access, wherein a second transmission power of the second preamble is based on the second preamble received target power value.

29. The base station of claim 28, wherein the first transmission power comprises a sum of the first preamble received target power value and a power offset value indicated by a preamble format parameter.

30. The base station of claim 28, wherein the instructions, when executed by the one or more processors, cause the base station to:
determine, based on receiving the first preamble, the beam failure of the cell; and
transmit, after determining the beam failure of the cell, a signal associated with beam failure recovery.

31. The base station of claim 28, wherein the first transmission power is further based on a first reference signal power value and a first path loss value.

32. The base station of claim 31, wherein the first path loss value is based on a layer 1 reference signal received power value.

33. The base station of claim 28, wherein the configuration parameters further comprise at least one of:
a channel state information reference signal;
a synchronization signal block; or
a demodulation reference signal for a physical broadcast channel.

34. The base station of claim 28, wherein the instructions, when executed by the one or more processors, cause the base station to:
transmit, before receiving the second preamble, a physical downlink control channel order to cause the wireless device to transmit the second preamble.

35. A wireless device comprising:
one or more processors; and
memory storing instructions that, when executed by the one or more processors, cause the wireless device to:

receive, from a base station, one or more radio resource control messages comprising configuration parameters, wherein the configuration parameters comprise:
a first target power value for beam failure recovery; and
a second target power value for random access;
detect a failure of a first beam;
transmit, based on detecting and using a first transmission power that is based on the first target power value, a first preamble for beam failure recovery;
receive a physical downlink control channel (PDCCH) order; and
transmit, based on the PDCCH order and using a second transmission power that is based on the second target power value, a second preamble for random access.

36. The wireless device of claim 35, wherein the instructions, when executed by the one or more processors, cause the wireless device to:
determine the first transmission power by adding the first target power value and a power offset value indicated by a preamble format parameter.

37. The wireless device of claim 35, wherein the first transmission power is further based on a first reference signal power value and a first path loss value.

38. The wireless device of claim 37, wherein the first path loss value is based on a layer 1 reference signal received power value.

39. The wireless device of claim 35, wherein the configuration parameters further comprise at least one of:
a channel state information reference signal;
a synchronization signal block; or
a demodulation reference signal for a physical broadcast channel.

40. The wireless device of claim 35, wherein the instructions, when executed by the one or more processors, cause the wireless device to:
based on receiving the PDCCH order, select the second preamble.

41. A non-transitory computer-readable medium storing instructions that, when executed, configure a wireless device to:
receive, from a base station, one or more radio resource control messages comprising configuration parameters of a cell, wherein the configuration parameters comprise:
a first preamble received target power value for beam failure recovery associated with the cell; and
a second preamble received target power value for random access associated with the cell;
based on a beam failure of the cell, transmit, using a first transmission power that is based on the first preamble received target power value, a first preamble for beam failure recovery associated with the beam failure of the cell; and
transmit, via the cell and using a second transmission power that is based on the second preamble received target power value, a second preamble associated with random access.

42. The non-transitory computer-readable medium of claim 41, wherein the instructions, when executed, further configure the wireless device to:
determine the first transmission power based on adding the first preamble received target power value and a power offset value indicated by a preamble format parameter.

43. The non-transitory computer-readable medium of claim 41, wherein the instructions, when executed, further configure the wireless device to:
measure, based on one or more first reference signal resources, a beam link quality; and
determine, based on the measured beam link quality, the beam failure of the cell.

44. The non-transitory computer-readable medium of claim 41, wherein the first transmission power is further based on a first reference signal power value and a first path loss value.

45. The non-transitory computer-readable medium of claim 44, wherein the first path loss value is based on a layer 1 reference signal received power value.

46. The non-transitory computer-readable medium of claim 41, wherein the configuration parameters further comprise at least one of:
a channel state information reference signal;
a synchronization signal block; or
a demodulation reference signal for a physical broadcast channel.

47. The non-transitory computer-readable medium of claim 41, wherein the instructions, when executed, further configure the wireless device to transmit the second preamble by:
transmitting, based on receiving a physical downlink control channel order, the second preamble.

48. A non-transitory computer-readable medium storing instructions that, when executed, configure a base station to:
transmit, to a wireless device, one or more radio resource control messages comprising configuration parameters of a cell, wherein the configuration parameters comprise:
a first preamble received target power value for beam failure recovery associated with the cell; and
a second preamble received target power value for random access associated with the cell;
receive, from the wireless device, a first preamble for beam failure recovery associated with a beam failure of the cell, wherein a first transmission power of the first preamble is based on the first preamble received target power value; and
receive, via the cell and from the wireless device, a second preamble associated with random access, wherein a second transmission power of the second preamble is based on the second preamble received target power value.

49. The non-transitory computer-readable medium of claim 48, wherein the first transmission power comprises a sum of the first preamble received target power value and a power offset value indicated by a preamble format parameter.

50. The non-transitory computer-readable medium of claim 48, wherein the instructions, when executed, further configure the base station to:
determine, based on receiving the first preamble, the beam failure of the cell; and
transmit, after determining the beam failure of the cell, a signal associated with beam failure recovery.

51. The non-transitory computer-readable medium of claim 48, wherein the first transmission power is further based on a first reference signal power value and a first path loss value.

52. The non-transitory computer-readable medium of claim 51, wherein the first path loss value is based on a layer 1 reference signal received power value.

53. The non-transitory computer-readable medium of claim 48, wherein the configuration parameters further comprise at least one of:
- a channel state information reference signal;
- a synchronization signal block; or
- a demodulation reference signal for a physical broadcast channel.

54. The non-transitory computer-readable medium of claim 48, wherein the instructions, when executed, further configure the base station to:
transmit, before receiving the second preamble, a physical downlink control channel order to cause the wireless device to transmit the second preamble.

55. A system comprising:
a base station; and
a wireless device,
wherein the base station is configured to:
transmit, to the wireless device, one or more radio resource control messages comprising configuration parameters of a cell, wherein the configuration parameters comprise:
a first preamble received target power value for beam failure recovery associated with the cell; and
a second preamble received target power value for random access associated with the cell; and
wherein the wireless device is configured to:
based on a beam failure of the cell, transmit, using a first transmission power that is based on the first preamble received target power value, a first preamble for beam failure recovery associated with the beam failure of the cell; and
transmit, via the cell and using a second transmission power that is based on the second preamble received target power value, a second preamble associated with random access.

56. The system of claim 55, wherein the wireless device is further configured to:
determine the first transmission power based on adding the first preamble received target power value and a power offset value indicated by a preamble format parameter.

57. The system of claim 55, wherein the wireless device is further configured to:
measure, based on one or more first reference signal resources, a beam link quality; and
determine, based on the measured beam link quality, the beam failure of the cell.

58. The system of claim 55, wherein the first transmission power is further based on a first reference signal power value and a first path loss value.

59. The system of claim 58, wherein the first path loss value is based on a layer 1 reference signal received power value.

60. The system of claim 55, wherein the configuration parameters further comprise at least one of:
- a channel state information reference signal;
- a synchronization signal block; or
- a demodulation reference signal for a physical broadcast channel.

61. The system of claim 55, wherein the wireless device is further configured to transmit the second preamble by:
transmitting, based on receiving a physical downlink control channel order, the second preamble.

62. The system of claim 55, wherein the base station is further configured to:
determine, based on receiving the first preamble, the beam failure of the cell; and
transmit, after determining the beam failure of the cell, a signal associated with beam failure recovery.

63. The system of claim 55, wherein the base station is further configured to:
transmit, before receiving the second preamble, a physical downlink control channel order to cause the wireless device to transmit the second preamble.

* * * * *

UNITED STATES PATENT AND TRADEMARK OFFICE
CERTIFICATE OF CORRECTION

PATENT NO. : 10,887,939 B2
APPLICATION NO. : 16/101283
DATED : January 5, 2021
INVENTOR(S) : Hua Zhou et al.

It is certified that error appears in the above-identified patent and that said Letters Patent is hereby corrected as shown below:

On the Title Page

In the List of References:

Page 3, Column 1, item (56) Other Publications, Line 38:
Please delete "Remaing" and insert --Remaining--

Page 3, Column 1, item (56) Other Publications, Line 50:
Delete "Apr. 15, 2019-Extented" and insert --Apr. 15, 2019-Extended--

Page 4, Column 2, item (56) Other Publications, Line 9:
Delete "mutli-CC" and insert --multi-CC--

Page 6, Column 1, item (56) Other Publications, Line 1:
Delete "Vacnouver," and insert --Vancouver,--

Page 6, Column 2, item (56) Other Publications, Line 8:
Delete "Incorpated," and insert --Incorporated,--

Page 6, Column 2, item (56) Other Publications, Line 49:
Delete "Prauge," and insert --Prague,--

Page 6, Column 2, item (56) Other Publications, Line 55:
Delete "Prauge," and insert --Prague,--

Page 7, Column 1, item (56) Other Publications, Line 67:
Delete "Speadtrum" and insert --Spreadtrum--

Page 7, Column 2, item (56) Other Publications, Line 8:
Delete "Nov.-Dec. 1, 2017," and insert --Nov. 27-Dec. 1, 2017,--

Signed and Sealed this
Seventh Day of March, 2023

Katherine Kelly Vidal
*Director of the United States Patent and Trademark Office*

Page 7, Column 2, item (56) Other Publications, Line 11:
Delete "Nov.-Dec. 1, 2017," and insert --Nov. 27-Dec. 1, 2017,--

Page 7, Column 2, item (56) Other Publications, Line 11:
Delete "Dicussion" and insert --Discussion--

Page 8, Column 2, item (56) Other Publications, Line 67:
Delete "Dormat" and insert --Dormant--

Page 9, Column 2, item (56) Other Publications, Line 29:
Delete "BeamFailureRecoveryConfig." and insert --Beam Failure Recovery Configuration.--

Page 10, Column 1, item (56) Other Publications, Line 26:
Delete "contiguration" and insert --configuration--

In the Drawings

Sheet 7 of 29, Fig. 7, Reference Numeral 723, Line 4:
Delete "SCH" and insert --SCG--

Sheet 7 of 29, Fig. 7, Reference Numeral 724, Line 3:
Delete "SCH" and insert --SCG--

In the Specification

Detailed Description, Column 11, Line 37:
Delete "SRB 1" and insert --SRB1--

Detailed Description, Column 11, Line 41:
Delete "SRB 1." and insert --SRB1.--

Detailed Description, Column 12, Line 39:
Delete "534" and insert --535--

Detailed Description, Column 12, Line 42:
Delete "535A and 535B" and insert --536A and 536B--

Detailed Description, Column 12, Line 45:
Delete "536A and 536B" and insert --537A and 537B--

Detailed Description, Column 13, Line 19:
Delete "621" and insert --620--

Detailed Description, Column 14, Line 7:
Delete "gNB s" and insert --gNBs--

CERTIFICATE OF CORRECTION (continued)
U.S. Pat. No. 10,887,939 B2

Detailed Description, Column 15, Line 52:
Delete "PDDCH" and insert --PDCCH--

Detailed Description, Column 15, Line 56:
Delete "PDDCH" and insert --PDCCH--

Detailed Description, Column 20, Line 64:
Delete "1312, 1312, and 1314" and insert --1312, 1313, and 1314--

Detailed Description, Column 25, Line 48:
Delete "1621" and insert --1620--

Detailed Description, Column 29, Line 31:
Delete "M>1" and insert --M$\geq$1--

Detailed Description, Column 33, Line 59:
Delete "2101," and insert --2102,--

Detailed Description, Column 34, Line 27:
Delete "BFR-BRACH" and insert --BFR-PRACH--